(12) United States Patent
Tomita et al.

(10) Patent No.: US 7,663,120 B2
(45) Date of Patent: Feb. 16, 2010

(54) RADIATION DETECTOR AND RADIATION DETECTING METHOD

(75) Inventors: Yasuhiro Tomita, Hamamatsu (JP); Yuji Shirayanagi, Hamamatsu (JP); Shinjiro Matsui, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 12/293,849

(22) PCT Filed: Feb. 26, 2007

(86) PCT No.: PCT/JP2007/053540

§ 371 (c)(1),
(2), (4) Date: Nov. 17, 2008

(87) PCT Pub. No.: WO2007/108279

PCT Pub. Date: Sep. 27, 2007

(65) Prior Publication Data

US 2009/0140159 A1    Jun. 4, 2009

(30) Foreign Application Priority Data

Mar. 23, 2006 (JP) .............................. 2006-081268

(51) Int. Cl.
*G01T 1/00* (2006.01)
(52) U.S. Cl. .................................... 250/394
(58) Field of Classification Search .................. 250/394
See application file for complete search history.

(56) References Cited

U.S. PATENT DOCUMENTS 6,006,162 A * 12/1999 Haywood ..................... 702/23
2004/0101089 A1   5/2004 Karau et al.

FOREIGN PATENT DOCUMENTS

| JP | 7-11575 B2 | 2/1995 |
|----|-----------|--------|
| JP | 9-269377 | 10/1997 |
| JP | 9-318755 | 12/1997 |
| JP | 2000-069369 | 3/2000 |
| JP | 2004-008460 | 1/2004 |
| JP | 2004-174260 | 6/2004 |
| JP | 2004-325183 | 11/2004 |

* cited by examiner

*Primary Examiner*—Constantine Hannaher
(74) *Attorney, Agent, or Firm*—Drinker Biddle & Reath LLP

(57) ABSTRACT

A radiation detector 6 detects radiation that passed through a specimen 2 by discriminating it by a plurality of energy regions. The radiation detector 6 includes a radiation detecting section 10 which generates output signals corresponding to energy of the incident radiation, and a signal processing section 20 which discriminates output signals by first through N-th signal discrimination thresholds $T_1$ through $T_N$ and acquires regional counts $A_1$ through $A_N$ as radiation counts in the plurality of energy regions $W_1$ through $W_N$ by counting the discriminated output signals. The first through N-th signal discrimination thresholds $T_1$ through $T_N$ are set so that reference regional counts $A_{1(B)}$ through $A_{N(B)}$ as regional counts in the plurality of energy regions $W_1$ through $W_N$ when the radiation detecting section 10 detects radiation (reference radiation) before passing through the specimen 2 become substantially equal.

12 Claims, 19 Drawing Sheets

*Fig.12*
(a) 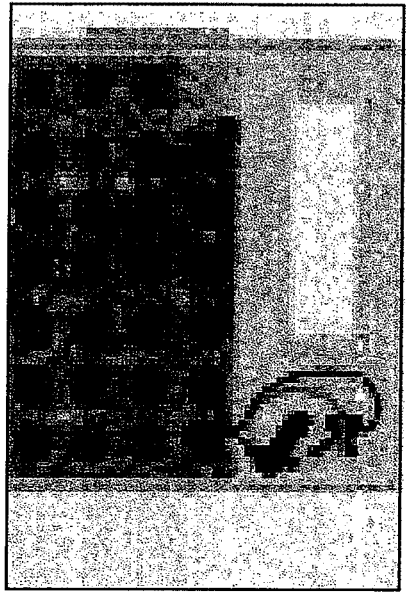
(c) 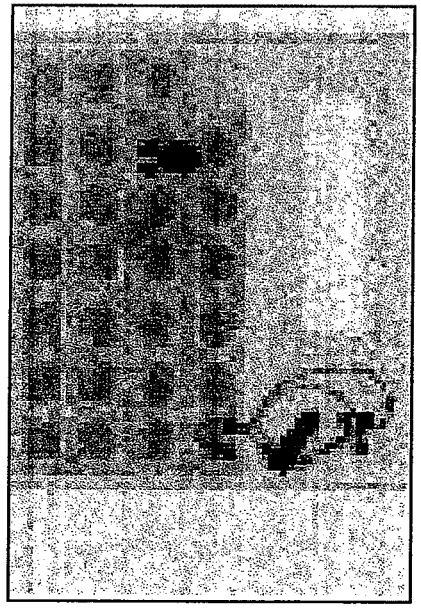
(b) 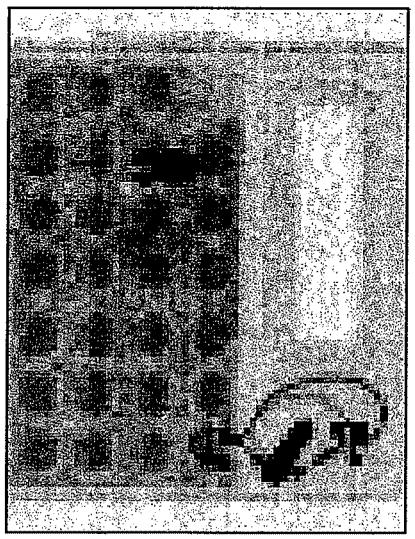

*Fig.16*
(a)
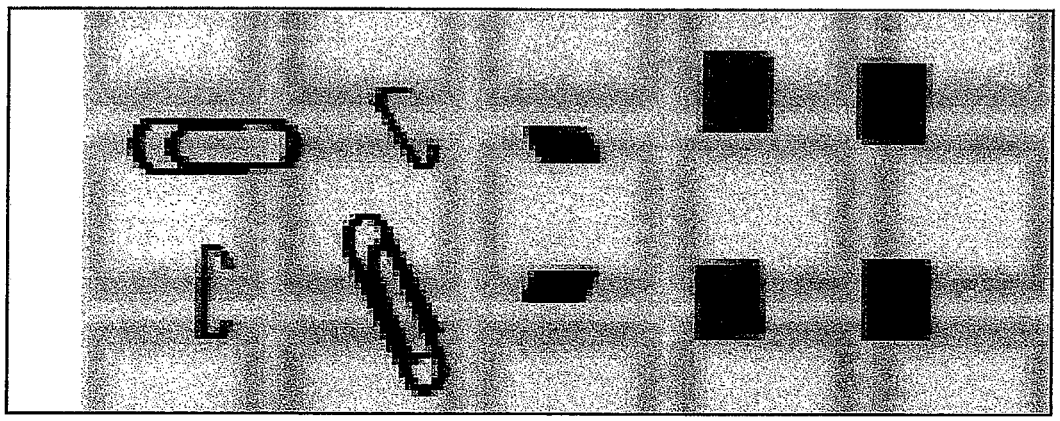
(b)
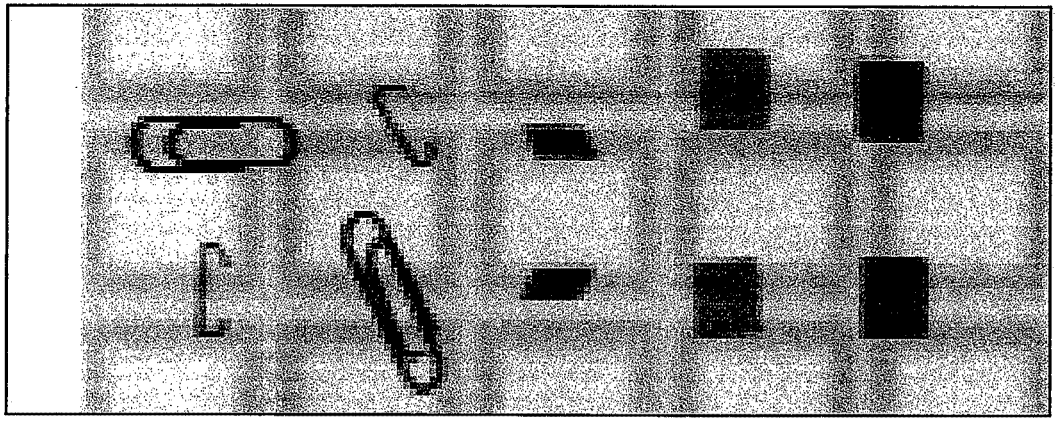

RADIATION DETECTOR AND RADIATION DETECTING METHOD

TECHNICAL FIELD

The present invention relates to an energy discrimination type radiation detector and radiation detection method.

BACKGROUND ART

Conventionally, as a radiation detector, a photon counting type which detects radiation by generating output signals corresponding to energy of radiation photons composing incident radiation, and counting the generated output signals for a predetermined time, is known. As such a photon counting type radiation detector, for example, there are radiation detectors of Patent documents 1 through 3.

The radiation detecting device (radiation detector) of the Patent document 1 pulse-height-discriminates output signals generated by detecting radiation with a semiconductor sensor and corrects outputs from the respective discriminators according to photon energy dependence of dose sensitivity of the sensor. By applying this correction, the detection sensitivity in the whole energy range detectable by the semiconductor sensor is equalized. In the radiation detector of Patent document 2, by setting energy windows with different energy window widths for radiation incident positions, the energy spectral influence depending on the incident position is corrected. Further, in the radiation detector of Patent document 3, crosstalk of a first count corresponding to the first main energy window is corrected based on the second count corresponding to the second sub-energy window and a ratio of the width of the first main energy window to the width of the second sub-energy window.

Patent document 1: Japanese Published Examined Patent Application No. H07-11575

Patent document 2: Japanese Published Unexamined Patent Application No. H09-269377

Patent document 3: Japanese Published Unexamined Patent Application No. H09-318755

DISCLOSURE OF THE INVENTION

Problem to be Solved by the Invention

In the radiation detector described in Patent document 1, the detection sensitivity in the detecting energy range of the semiconductor sensor is adjusted according to the wave-height discriminated count, however, radiation detection is performed for the whole detecting energy range of the semiconductor sensor. In Patent document 2, a detecting energy range corresponding to an incident position of radiation on the radiation detector is set, and this is for reliable detection of the radiation at each incident position. In Patent document 3, crosstalk between energy windows for detecting radiation output from Tl-201 and radiation output from Tc-99m is corrected, and one radiation (for example, radiation output from Tl-201) is detected by one energy window.

On the other hand, recently, in a radiation detector to be applied to a non-destructive test conducted by irradiating a specimen with radiation output from a radiation irradiator, an energy discrimination type has been demanded. An energy discrimination type radiation detector detects radiation made incident on the radiation detector by energy discriminating it according to energy values of radiation photons.

As a method for obtaining such radiation counts on an energy window basis, it is possible that the widths of the energy windows are substantially fixed. However, normally, the radiation itself to be irradiated onto a specimen has energy characteristics, so that among energy windows divided at even energy intervals as described above, detection sensitivity differences according to the energy characteristics of the radiation itself occur.

Therefore, an object of the invention is to provide an energy discrimination type radiation detector and radiation detection method in which the detection sensitivity is equalized among a plurality of energy regions.

Means for Solving the Problem

A radiation detector of the present invention detects radiation irradiated onto a specimen and passed through the specimen by discriminating it by a plurality of energy regions, and includes a radiation detecting section which generates output signals corresponding to energy of the incident radiation, and a signal processing section which discriminates the output signals by first through N-th signal discrimination thresholds corresponding to N energy values (N: integer of 1 or more) for dividing a plurality of energy regions, regional counts as radiation counts per a predetermined time in the plurality of energy regions are acquired by counting a discriminated output signal, wherein when radiation which is to be irradiated onto a specimen and before passing through the specimen is defined as reference radiation, the first through N-th signal discrimination thresholds are set so that reference regional counts as regional counts in the plurality of energy regions when the radiation detecting section detects the reference radiation become substantially equal.

In this construction, output signals output from the radiation detecting section are discriminated by first through N-th signal discrimination thresholds by the signal discriminating section. The discriminated output signals are further counted by the signal discriminating section, whereby regional counts in the plurality of energy regions are acquired. Accordingly, radiation made incident on the radiation detecting section can be detected by being discriminated by a plurality of energy regions according to the energy of the radiation.

The reference radiation is radiation which is to be irradiated onto a specimen and before being irradiated onto a specimen, so that when the radiation that has passed through a specimen is detected by the radiation detector, the regional counts in the plurality of energy regions change with respect to the reference regional counts in the corresponding energy regions. Therefore, the detection sensitivities in the plurality of energy regions are determined according to the reference regional counts. In the radiation detector described above, the first through N-th signal discrimination thresholds are set so that the reference regional counts in the plurality of energy regions become substantially equal, so that the detection sensitivity is substantially equalized among the plurality of energy regions.

Further, it is preferable that the signal processing section of the radiation detecting device includes a signal discriminating section which discriminates output signals by first through N-th signal discrimination thresholds, a counting section which acquires threshold-based counts as radiation counts per a predetermined time with respect to the first through N-th signal discrimination thresholds by counting an output signal discriminated by a signal discriminating section, an arithmetic section which calculates regional counts based on the threshold-based counts acquired through the counting section, and a threshold setting section which sets the first through N-th signal discrimination thresholds in the signal discriminating section so that the reference regional count values in the plurality of energy regions become substantially equal.

In this construction, output signals from the radiation detecting section are discriminated by the first through N-th signal discrimination thresholds, and then counted by the counting section. Therefore, with respect to the first through N-th signal discrimination thresholds, threshold-based counts can be acquired. Then, based on threshold-based counts acquired in the counting section, the arithmetic section calculates regional counts in the plurality of energy regions determined with respect to the first through N-th signal discrimination thresholds, so that regional counts in the plurality of energy regions can be acquired. The threshold setting section of the signal processing section sets first through N-th signal discrimination thresholds, so that it is possible to set first through N-th signal discrimination values for each use of the radiation detector.

Thus, in the radiation detector in which the signal processing section includes a threshold setting section, the first signal discrimination threshold corresponds to a minimum energy value among N energy values, and in a case where the radiation detecting section detects reference radiation, when a value obtained by dividing the threshold-based count acquired with respect to the first signal discrimination threshold by the number of energy regions is defined as a regulated value, it is preferable that the threshold setting section sets first through N-th signal discrimination thresholds so that reference regional counts in the plurality of energy regions substantially coincide with the regulated value.

The first signal discrimination threshold corresponds to the minimum energy value, so that the threshold-based count with respect to the first signal discrimination threshold becomes maximum among threshold-based counts with respect to the first through N-th signal discrimination thresholds. Thereby, by setting the first through N-th signal discrimination thresholds based on the regulated value, the reference regional counts in the plurality of energy regions can be made larger. As a result, along with equalization of the detection sensitivity, the detection sensitivity lowering can be prevented.

It is preferable that the signal processing section of the radiation detecting device creates regional image data for forming images of a specimen in the plurality of energy regions based on regional counts in the plurality of energy regions when the radiation detecting section detects radiation that has passed through the specimen. In this radiation detecting device, detection sensitivities in the plurality of energy regions are equalized. Therefore, image qualities of the images of the specimen in the respective energy regions formed by using the regional image data created as described above are equalized among the images.

In the radiation detector in which the signal processing section includes a signal discriminating section, a counting section, and a arithmetic section, the first signal discrimination threshold corresponds to the minimum energy value among N energy values, the arithmetic section creates regional image data for forming images of the specimen in the plurality of energy regions based on the regional counts in the plurality of energy regions, creates material identifying image data for forming a material identifying image containing extracted material information of the specimen based on the plurality of regional image data, and creates shape recognizing image data for forming a shape recognizing image showing the shape of the specimen based on a threshold-based count with respect to the first signal discrimination threshold acquired by the counting section, and thereafter, preferably creates composite image data for forming a composite image composed of the shape recognizing image and the material identifying image from the shape recognizing image data and the material identifying image data.

In this case, the arithmetic section creates regional image data based on regional counts in the plurality of energy regions equalized in detection sensitivity. As a result, images of a specimen in the energy regions can be obtained in the state where the image quality is substantially equalized among the images.

Further, the arithmetic section creates material identifying data for forming a material identifying image containing extracted material information of the specimen by using the plurality of regional image data. As a result, a material identifying image can be obtained from the created material identifying image data, and as a result, material differences included in the specimen can be identified.

Further, the arithmetic section creates shape recognizing image data based on a threshold-based count with respect to the first signal discrimination threshold. The first signal discrimination threshold corresponds to the minimum energy value, so that the threshold-based count with respect to the first signal discrimination threshold becomes maximum among threshold-based counts acquired with respect to the first through N-th signal discrimination thresholds. Therefore, the shape of the specimen can be reliably recognized based on the shape recognizing image formed from the shape recognizing image data.

In the images of the specimen in the plurality of energy regions and the material identifying image, the detection energy regions are restricted, and therefore, for example, the influence of noise tends to be larger than in the image of the specimen formed by using the threshold-based counts. On the other hand, in the radiation detecting device, the arithmetic section creates composite image data composed of the shape recognizing image data and material identifying image data. A composite image formed from the composite image data is composed of the shape recognizing image and the material identifying image, so that while the shapes of portions made of different materials included in the specimen is confirmed, the materials of the portions can be identified at the same time.

A radiation detection method of the present invention detects radiation that was irradiated onto a specimen and passed through the specimen by discriminating it by a plurality of energy regions by a radiation detector which includes a radiation detecting section for detecting radiation and a signal processing section which discriminates output signals output from the radiation detecting section by signal discrimination thresholds and counts the discriminated signals, including: (1) a detection step at which radiation is detected by the radiation detecting section and output signals corresponding to energy of the detected radiation generated; (2) a signal discrimination step at which the output signals generated through the detection step are discriminated by the signal processing section by using first through N-th signal discrimination thresholds corresponding to N (N: integer of 1 or more) energy values for dividing into a plurality of energy regions; and (3) a count acquisition step at which regional counts as radiation counts per a predetermined time in the plurality of energy regions by counting the output signals discriminated through the signal discrimination step by the signal processing section, wherein when radiation which is to be irradiated onto a specimen and before passing through the specimen is defined as reference radiation, the first through N-th signal discrimination thresholds are set so that reference regional counts as regional counts in the plurality of energy regions in a case where reference radiation is detected through the detection step become substantially equal.

In this case, output signals generated through the detection step are discriminated by the first through N-th signal discrimination thresholds by the signal discriminating section at the signal discrimination step. Then, the discriminated output signals are further counted by the signal discriminating section at the counting step, whereby regional counts in the plurality of energy regions divided by energy values corresponding to the first through N-th signal discrimination thresholds are acquired. Therefore, the radiation to be made incident on the radiation detecting section can be detected discriminatively in the plurality of energy regions corresponding to energy of the radiation.

The reference radiation is to be irradiated onto a specimen and before being irradiated onto a specimen, so that when radiation that has passed through a specimen is detected through the detection step, regional counts in the plurality of energy regions change with respect to the reference regional counts in the corresponding energy regions. Therefore, the detection sensitivities in the plurality of energy regions are determined according to the reference regional counts. Then, in the above-described method, the first through N-th signal discrimination thresholds are set so that the reference regional counts in the plurality of energy regions become substantially equal, so that the detection sensitivity is substantially equalized among the plurality of energy regions.

It is preferable that the count acquisition step of the radiation detecting method includes a counting step at which are acquired threshold-based counts as radiation counts per a predetermined time of the first through N-th signal discrimination thresholds by counting the output signals discriminated through the signal discrimination step, and an arithmetic operation step at which regional counts are calculated based on the threshold-based counts acquired through the counting step.

In this case, output signals discriminated by the first through N-th signal discrimination thresholds at the signal discrimination step are counted through the counting step, whereby threshold-based counts as radiation counts per a predetermined time of the first through N-th signal discrimination thresholds can be acquired. Then, at the arithmetic operation step, regional counts are calculated based on the threshold-based counts acquired through the counting step, so that regional counts in the plurality of energy regions can be acquired.

Further, it is preferable that the radiation detection method further includes a regional image data creation step at which, when the radiation detecting section detects radiation that has passed through a specimen at the detection step, regional image data for forming images of the specimen in the plurality of energy regions are created based on regional counts acquired through the count acquisition step.

In this radiation detection method, the detection sensitivity is equalized among the plurality of energy regions. Therefore, the image qualities of the images of the specimen in the energy regions formed by using the regional image data created as described above are substantially equalized.

Further, in the radiation detection method in which the count acquisition step includes the counting step and the arithmetic operation step, it is preferable that the first signal discrimination threshold corresponds to the minimum energy value among N energy values, and the method further includes an image data creation step at which image data for forming images of a specimen are created when the radiation detecting section detects radiation that has passed through the specimen at the detection step, and the image data creation step includes: (1) a shape recognizing image data creation step at which shape recognizing image data for forming a shape recognizing image showing the shape of the specimen is created based on a threshold-based count acquired with respect to the first signal discrimination threshold at the count acquisition step; (2) a regional image data creation step at which regional image data for forming images of the specimen in a plurality of energy regions are created based on regional counts acquired through the count acquisition step; (3) a material identifying image data creation step at which material identifying image data for forming a material identifying image containing extracted material information of the specimen is created based on the regional image data corresponding to the plurality of energy regions created through the regional image data creation step; and (4) a composite image data creation step at which composite image data for forming a composite image composed of the shape recognizing image and the material identifying image is created from the shape recognizing image data and the material identifying image data.

In this case, at the shape recognizing image data creation step of the image data creation step, shape recognizing image data is created based on a threshold-based count with respect to the first signal discrimination threshold. The first signal discrimination threshold corresponds to the minimum energy value, so that the threshold-based count with respect to the first signal discrimination threshold becomes maximum among the threshold-based counts acquired with respect to the first through N-th signal discrimination thresholds. Therefore, based on a shape recognizing image formed from the shape recognizing image data, the shape of the specimen can be reliably recognized.

Further, at the regional image data creation step of the image data creation step, regional image data are created based on regional counts in the plurality of energy regions which are equalized in detection sensitivity. As a result, images of the specimen in the respective energy regions can be obtained in the state where the image quality is substantially equalized among the images.

Further, at the material recognizing image data creation step of the image data creation step, a material identifying image data for forming a material identifying image containing extracted material information of the specimen is formed by using the plurality of regional image data. As a result, a material identifying image can be obtained from the created material identifying image data, and as a result, material differences included in the specimen can be identified.

In the images of the specimen in the plurality of energy regions and the material identifying image, the detection energy regions are restricted, so that, for example, the influence of noise tends to be larger than in the image of the specimen formed by using the threshold-based counts. On the other hand, in the above-described radiation detection method, at the composite image data creation step of the image data creation step, composite image data is created from the shape recognizing image data and the material identifying image data. A composite image formed from this composite image data is composed of the shape recognizing image and the material identifying image, so that while the shapes of portions of different materials included in the specimen are confirmed, the materials can be identified at the same time.

It is preferable that the above-described radiation detection method further includes a threshold setting step at which first through N-th signal discrimination thresholds are set, and the threshold setting step includes a first setting step at which the first signal discrimination threshold is set so as to correspond to the minimum energy value among the N energy values, a reference radiation detection step at which reference output signals as output signals correspond to the energy of reference radiation by detecting the reference radiation by the radiation detecting section; a reference count acquisition step at which a reference count as a radiation count per a predetermined time is acquired by discriminating and counting the reference output signals with respect to the first signal discrimination threshold; and a second setting step at which the second through N-th signal discrimination thresholds among the first through N-th signal discrimination thresholds are set by using the radiation count per the predetermined time acquired by discriminating and counting the reference output signals in the signal processing section while changing the signal discrimination threshold in the signal processing section and the reference count.

In this case, the reference count is acquired by discriminating and counting the reference output signals generated through the reference radiation detection step with respect to the first signal discrimination threshold set at the first setting step. Then, by using the radiation counts acquired in the signal processing section while changing the signal discrimination threshold and the reference count, the second through N-th signal discrimination thresholds are set.

The reference count acquired through the reference count acquisition step becomes maximum among the radiation counts (threshold-based counts) acquired with respect to the first through N-th signal discrimination thresholds. Therefore, by setting the second through N-th signal discrimination thresholds which are set so that the regional counts in the plurality of energy regions become substantially equal by using the reference count, the detection sensitivities in the plurality of energy regions can be increased. In addition, the second through N-th signal discrimination thresholds are set by using the radiation counts acquired with respect to the respective signal discrimination thresholds while changing the signal discrimination threshold, so that the regional counts in the plurality of energy regions can be more reliably set so as to be substantially equal.

It is preferable that the second setting step of the threshold setting section includes an m-th threshold setting step at which the m-th signal discrimination threshold (m: integer of 2 to N) among the second through N-th signal discrimination thresholds is set, and a signal discrimination threshold when the difference between a radiation count per a predetermined time acquired by discriminating and counting the reference output signals while changing the signal discrimination threshold in the signal processing section from the (m−1)th signal discrimination threshold and a radiation count per a predetermined time acquired by discriminating and counting the reference output signals by using the signal discrimination threshold in the signal processing section set to the (m−1)th signal discrimination threshold substantially coincide with a regulated value determined according to the reference count is set as the m-th signal discrimination threshold, and by repeating the m-th threshold setting step, the second through N-th signal discrimination thresholds are set.

The difference between the radiation count acquired by discriminating the reference output signals while changing the signal discrimination threshold from the (m−1)th signal discrimination threshold and the radiation count acquired by discriminating the reference output signals by the (m−1)th signal discrimination threshold corresponds to a regional count between energy values corresponding to these two signal discrimination thresholds. Therefore, by determining the m-th signal discrimination threshold so that the regional count substantially coincides with the regulated value, the second through N-th signal discrimination thresholds can be set so that the regional counts in the plurality of energy regions substantially coincide with each other.

At the first setting step of the threshold setting step in the radiation detecting method, it is preferable that, when no radiation is made incident on the radiation detecting section, a signal discrimination threshold when the count per a predetermined time acquired by discriminating and counting output signals output from the radiation detecting section while changing the signal discrimination threshold of the signal processing section becomes a reference value or less is set as a first signal discrimination signal.

Output signals may be output from the radiation detecting section even when no radiation is irradiated onto the radiation detecting section, and count results of such output signals in the signal processing section become noise known as dark counts when detecting radiation. By setting the first signal discrimination threshold as described above, the influence of the dark count can be reduced, and more accurate detection of radiation is possible.

EFFECT OF THE INVENTION

According to the radiation detector and radiation detection method of the present invention, radiation can be detected by energy discriminating it with a detection sensitivity substantially equal among a plurality of energy regions.

BRIEF DESCRIPTION OF THE DRAWINGS

FIG. 12 are views corresponding to images of a specimen when regional counts in the plurality of energy regions are substantially equalized;

FIG. 16 are views corresponding to images of the specimen in the plurality of energy regions;

DESCRIPTION OF THE REFERENCE NUMERALS

1: non-destructive inspection system, 2: specimen, 2A, 2B, 2C, 2D, and 2E: members (portions of different materials), 3: radiation irradiator, 4: radiation detecting device, 6: radiation detector, 7: control device, 10: radiation detecting section, 20: signal processing section, 40: signal discriminating section, 50: threshold setting section, 60: counting section, 80: arithmetic section

BEST MODE FOR CARRYING OUT THE INVENTION

Hereinafter, an embodiment of the radiation detector and the radiation detection method of the present invention will be described with reference to the drawings.

Figure 1:
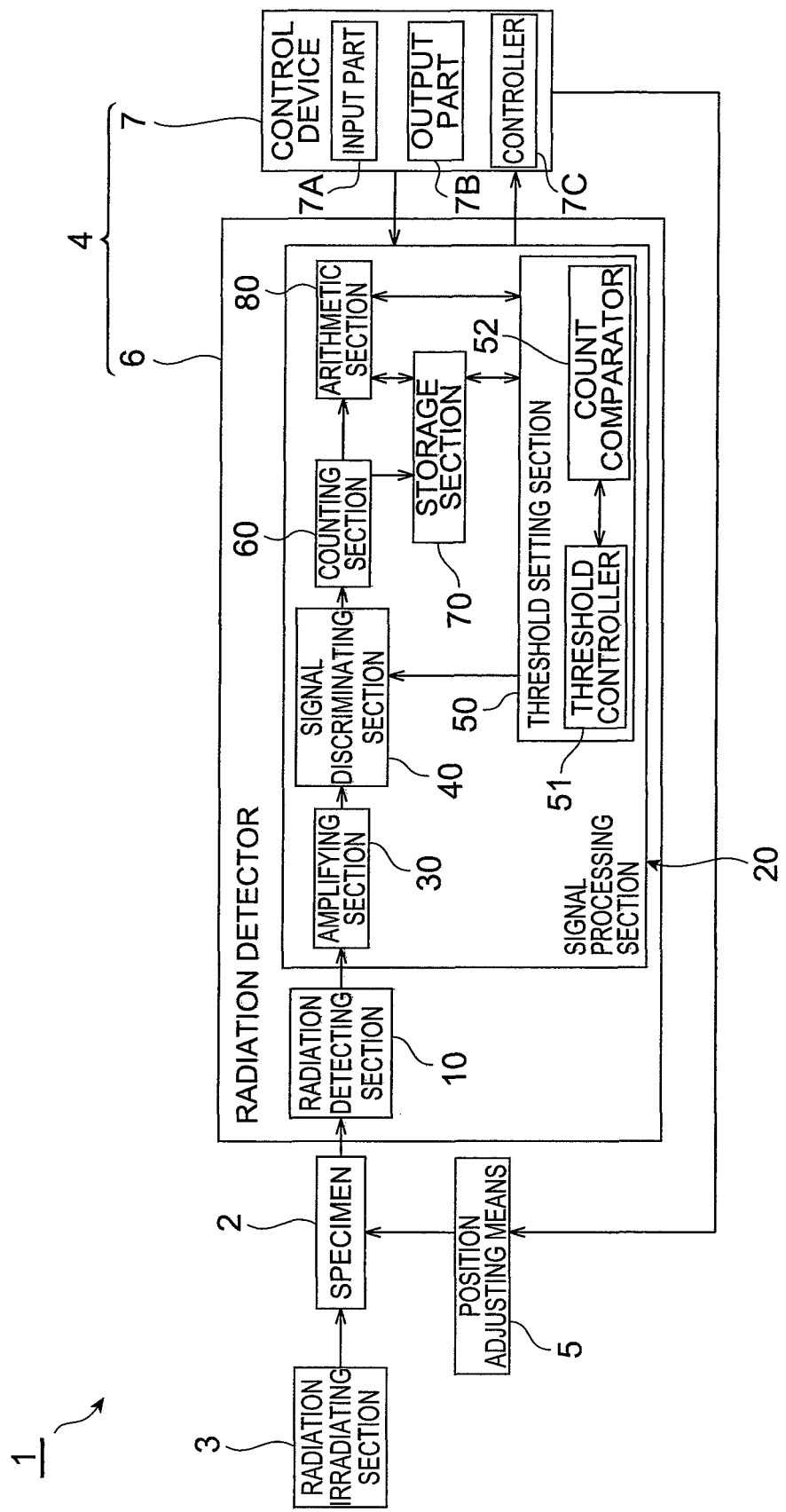
FIG. 1 is a block diagram showing a construction of a non-destructive inspection system to which an embodiment of the radiation detector of the present invention is applied.
Figure 2:
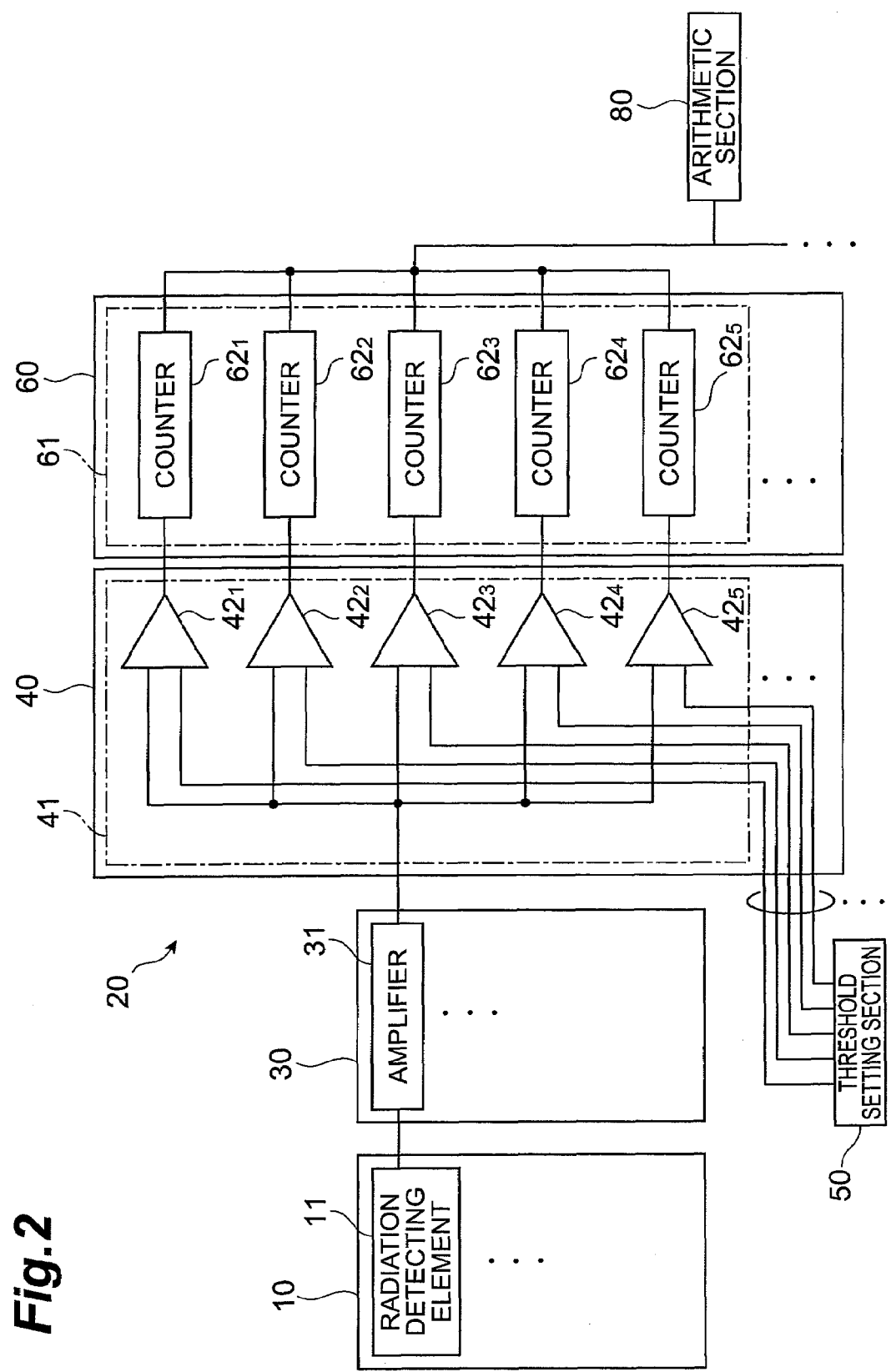
FIG. 2 is a schematic construction view showing a construction of a signal discriminating section of the radiation detector shown in FIG. 1.

FIG. 1 is a block diagram showing a construction of a non-destructive inspection system to which an embodiment of the radiation detector of the present invention is applied. FIG. 2 is a schematic construction view showing a construction of a signal discriminating section of the radiation detector shown in FIG. 1. FIG. 2 shows a part of the construction of the signal discriminating section.

The non-destructive inspection system 1 performs non-destructive inspection of a specimen 2, and is used for, for example, baggage inspection at airports and foreign substance inspection of foods, etc. The non-destructive inspection system 1 includes a radiation irradiator 3 which outputs radiation to be irradiated onto the specimen 2, a radiation detecting device 4 which detects radiation, and a position adjusting means 5 for adjusting the inspection position of the specimen 2. The position adjusting means 5 may be, for example, a manipulator which moves the specimen 2 while holding it, or may be a stage capable of moving the specimen 2 in a direction substantially orthogonal to the irradiating direction of the radiation mounted with the specimen 2.

The radiation irradiator 3 is an X-ray tube (radiation source) which outputs an X-ray (radiation). Radiation which is to be output from this radiation irradiator 3 and irradiated onto the specimen 2 and before passing through the specimen 2 is referred to as reference radiation as radiation in a reference state. The radiation irradiator 3 may include a radiation adjusting section (not shown) such as a filter for shaping a waveform of radiation output from the radiation source such as an X-ray tube or cutting-out a desired energy region. When the radiation irradiator 3 includes such a radiation adjusting section, radiation that has been output from the radiation source and passed through the radiation adjusting section becomes reference radiation to be output from the radiation irradiator 3. This reference radiation has energy characteristics in which, for example, the number of radiation photons decreases as the energy increases as shown in FIG. 3.

As shown in FIG. 1 and FIG. 2, the radiation detecting device 4 includes a radiation detector 6 which detects radiation according to a photon counting method and a control device 7 which controls the radiation detector 6. The control device 7 is a personal computer (PC) including an input part 7A such as a keyboard, an output part 7B such as a display, and a controller 7C including a CPU, etc. The control device 7 inputs data into the radiation detector 6 by using the input part 7A, and displays data output from the radiation detector 6 by using the output part 7B. The control device 7 also has a function for adjusting the inspection position of the specimen 2 by controlling the position adjusting means 5. Herein, the control device 7 is a PC including the controller 7C, however, it is only required to have the input part 7A and the output part 7B.

Figure 3:
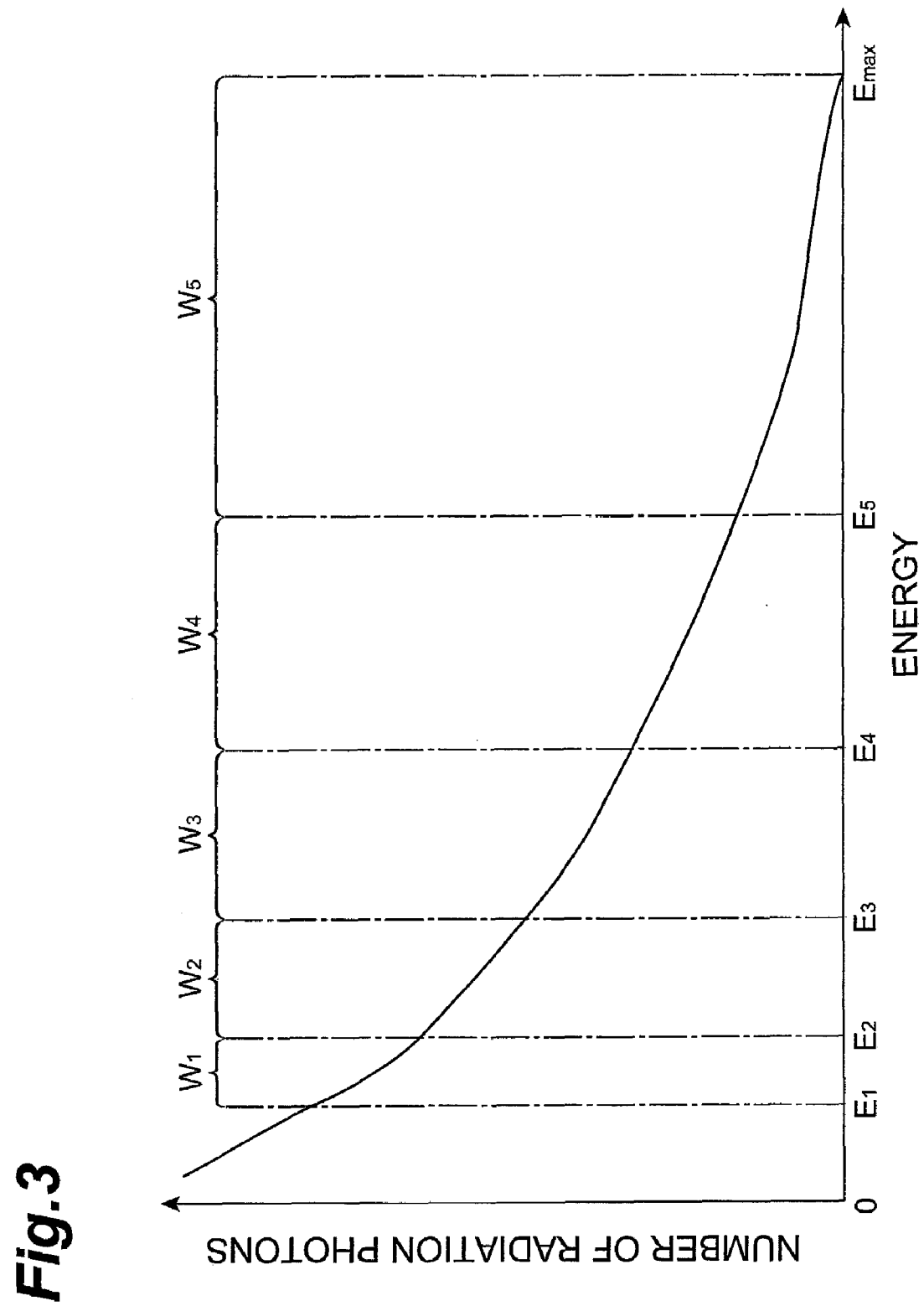
FIG. 3 is a schematic diagram of an example of energy characteristics of reference radiation.

The radiation detector 6 is an energy discrimination type detector, and detects incident radiation by discriminating it by energy windows (energy regions) $W_1$ through $W_N$ divided by N (N=5 in FIG. 3) energy values $E_1$ through $E_N$ as shown in FIG. 3 according to the energy of the radiation. As shown in FIG. 3, the energy window $W_N$ corresponds to an energy region set according to the energy value $E_N$ and maximum energy value $E_{max}$ of the reference radiation. Maximum energy value $E_{max}$ is an energy value whose intensity becomes almost zero in the energy characteristics of the reference radiation, and for example, in a case where the radiation is an X-ray output from an X-ray tube, maximum energy value is energy corresponding to maximum value of the tube voltage applied to the X-ray tube. The construction of the radiation detector 6 will be described in detail.

As shown in FIG. 1 and FIG. 2, the radiation detector 6 includes a radiation detecting section 10 which detects radiation and generates output signals corresponding to the energy of the radiation.

The radiation detecting section 10 is a line sensor including a plurality (for example, 64) of radiation detecting elements 11 aligned in a line (see FIG. 2) which detect radiation. As each radiation detecting element 11, an element using cadmium telluride is illustrated. The radiation detecting element 11 generates a pulse signal (output signal) having a wave height value corresponding to the energy value of the radiation photons composing the incident radiation and outputs it to the signal processing section 20 of the radiation detector 6.

The signal processing section 20 is a signal processing circuit such as an IC (ASIC) for a specific purpose, etc., electrically connected to the radiation detecting section 10, and applies predetermined signal processing (for example, counting or image formation, etc.) to the pulse signals input from the radiation detecting section 10. The signal processing section 20 is electrically connected to the control device 7, and receives data, etc., input through the input part 7A, and outputs data (radiation count data and image data, etc.) obtained through the signal processing in the signal processing section 20 to the control device 7.

The signal processing section 20 includes an amplifying section 30 which amplifies the pulse signals input from the radiation detecting section 10. The amplifying section 30 includes amplifiers 31 (see FIG. 2) corresponding to the respective radiation detecting elements 11, and the amplifiers 31 amplify pulse signals input from the radiation detecting elements 11 and shape the waveforms thereof. The amplifiers 31 input amplified pulse signals (hereinafter, referred to as "amplified pulse signals") into the signal discriminating section 40.

The signal discriminating section 40 discriminates the amplified pulse signals input from the amplifying section 30 by first through N-th signal discrimination thresholds $T_1$ through $T_N$ (hereinafter, also referred to as "signal discrimination thresholds $T_1$ through $T_N$, simply) set by the threshold setting section 50 and then outputs these to the counting section 60. The N signal discrimination thresholds $T_1$ through $T_N$ correspond to N energy values $E_1$ through $E_N$ dividing the plurality of energy windows $W_1$ through $W_N$, and are used for discriminating the amplified pulse signals with a predetermined wave height or more from the amplified pulse signals.

As shown in FIG. 2, the signal discriminating section 40 includes discriminator units 41 corresponding to the plurality of radiation detecting elements 11. Each discriminator unit 41 includes N (N=5 in FIG. 2) wave height discriminators $42_1$ through $42_N$. The signal discrimination thresholds $T_1$ through $T_N$ are assigned to the wave height discriminators $42_1$ through $42_N$, and voltage signals having voltage values corresponding to the signal discrimination thresholds $T_1$ through $T_N$ are input therein.

The wave height discriminators $42_1$ through $42_N$ generate output pulse signals by discriminating the amplified pulse signals which were output from the radiation detecting elements 11 and amplified in the amplifiers 31 by the signal discrimination thresholds $T_1$ through $T_N$.

The counting section 60 counts output pulse signals discriminated in the signal discriminating section 40. The counting section 60 includes counter units 61 corresponding to the plurality (for example, 64) of discriminator units 41. Each counter unit 61 includes counters $62_1$ through $62_N$ electrically connected to the wave height discriminators $42_1$ through $42_N$ of the discriminator unit 41.

The counters $62_1$ through $62_N$ count output pulse signals output from the corresponding wave height discriminators $42_1$ through $42_N$ for a fixed accumulation time (predetermined time) and acquire radiation counts $C_1$ through $C_N$ per the accumulation time. The radiation counts $C_1$ through $C_N$ correspond to the numbers of radiation photons having energy equal to or more than the energy values $E_1$ through $E_N$ corresponding to the signal discrimination thresholds $T_1$ through $T_N$. Hereinafter, the radiation counts $C_1$ through $C_N$ (radiation count C) with respect to the signal discrimination thresholds $T_1$ through $T_N$ (signal discrimination threshold T) are also referred to as threshold-based counts $C[T_1]$ through $C[T_N]$ (threshold-based count C[T]). The threshold-based counts $C[T_1]$ through $C[T_N]$ are stored in a storage section 70 (see FIG. 1) of the signal processing section 20.

As shown in FIG. 1, the signal processing section 20 further includes an arithmetic section 80 which applies various arithmetic operation processing to the threshold-based counts $C[T_1]$ through $C[T_N]$ acquired in the counting section 60.

The arithmetic section 80 calculates radiation counts $A_1$ through $A_N$ per the accumulation time (hereinafter, referred to as "regional counts") in the respective N energy windows $W_1$ through $W_N$ based on the threshold-based counts $C[T_1]$ through $C[T_N]$ obtained in the counting section 60. The regional counts $A_1$ through $A_N$ are calculated by calculating the differences between adjacent threshold-based counts $C[T_1]$ through $C[T_N]$ with respect to the signal discrimination thresholds $T_1$ through $T_N$. In detail, for example, by calculating the difference between the threshold-based count $C[T_1]$ and the threshold-based count $C[T_2]$, the regional count $A_1$ in the energy window $W_1$ is calculated. The calculated regional counts $A_1$ through $A_N$ are stored in the storage section 70.

The arithmetic section 80 also has a function as an image data creating section which creates image data for forming images of the specimen 2 by using the threshold-based counts $C[T_1]$ through $C[T_N]$ and the regional counts $A_1$ through $A_N$. The arithmetic section 80 maps the threshold-based count $C[T_1]$ discriminated by the first signal discrimination threshold $T_1$ corresponding to the minimum energy value $E_1$ among the energy values $E_1$ through $E_N$ according to position information of the radiation detecting elements 11 in the radiation detecting section 10 and inspection position information (measuring line) of the specimen 2. Accordingly, shape recognizing image data for forming an image which is a transmission image of the specimen 2 by means of the radiation and shows the shape of the specimen 2 (hereinafter, referred to as "shape recognizing image") is created.

The arithmetic section 80 creates regional image data for forming images of the specimen 2 in the respective energy windows $W_1$ through $W_N$ by mapping the regional counts $A_1$ through $A_N$ in the same manner as in the case of the shape recognizing image data creation. The regional image data in the respective energy windows $W_1$ through $W_N$ are created according to the regional counts $A_1$ through $A_N$ acquired in the state where the detection energy regions are restricted, so that the regional image data includes at least a part of material information of portions of different materials included in the specimen 2 (for example, a portion cut out by the detection energy region of the transmission characteristics). As a result, as described later, material information can be extracted by using a plurality of regional image data of the regional image data corresponding to the energy windows $W_1$ through $W_N$.

The arithmetic section 80 creates material identifying image data for forming a material identifying image from which the materials of the specimen 2 can be identified (containing extracted material information) by applying a material identifying arithmetic operation for extracting material information included in each regional image data to the plurality of regional image data. Further, the arithmetic section 80 creates composite image data for forming a composite image composed of the material identifying image and the shape recognizing image by superimposing the created material identifying image data on the shape recognizing image data.

Figure 4:
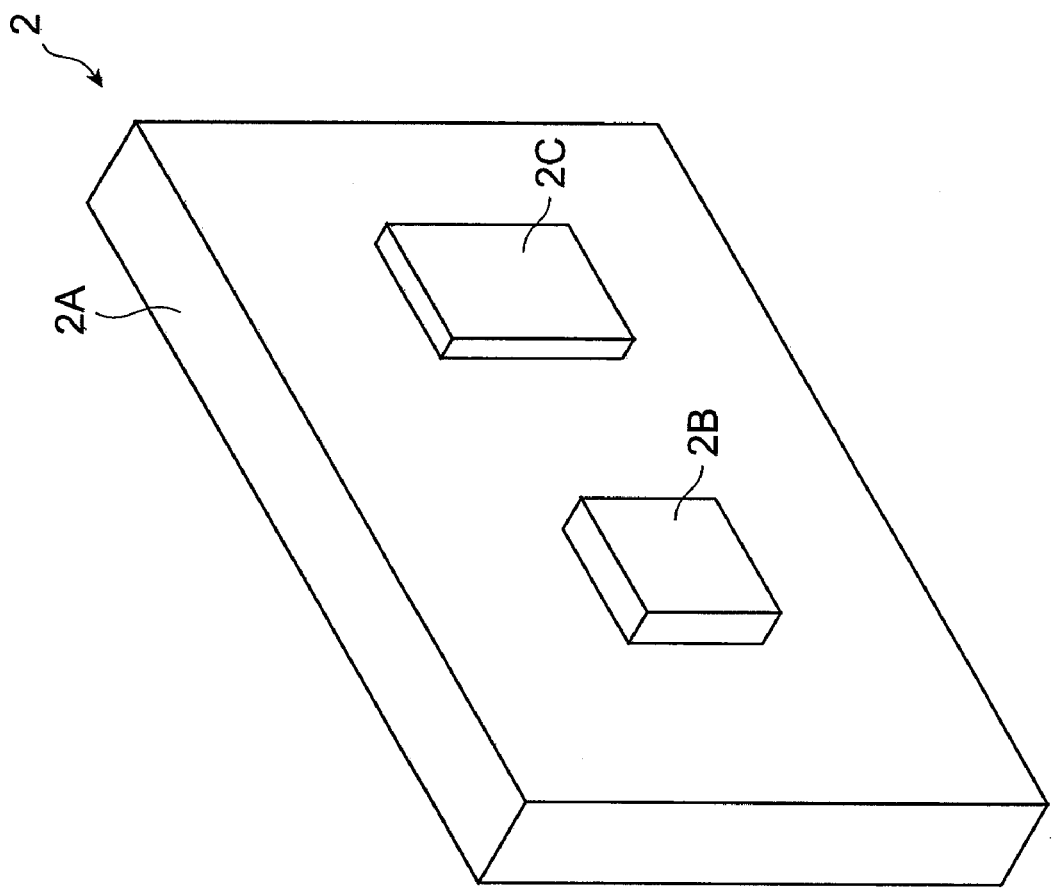
FIG. 4 is a schematic diagram of an example of a specimen.
Figure 5:
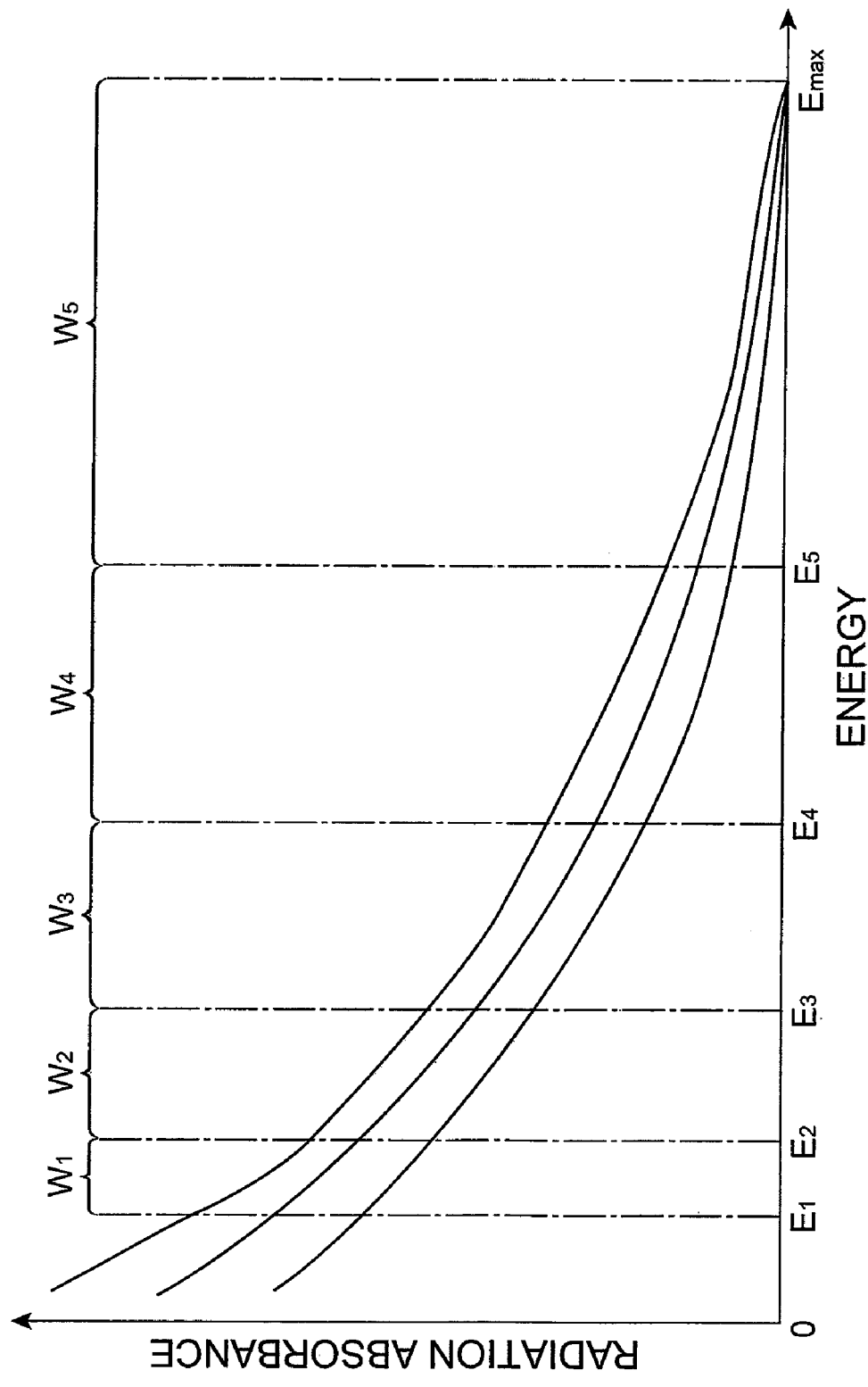
FIG. 5 is a schematic diagram of energy characteristics of radiation that has passed through members of the specimen shown in FIG. 4.

The principle of creation of the material identifying image data will be described with reference to FIG. 4 and FIG. 5. FIG. 4 is a schematic diagram of an example of the specimen. As shown in FIG. 4, the specimen 2 has three members 2A, 2B, and 2C made of different materials, and the member 2B and the member 2C are attached to one side surface of the member 2A. FIG. 5 is a schematic diagram of energy characteristics of radiation which passed through the members 2A through 2C of the specimen shown in FIG. 4. In FIG. 5, the horizontal axis shows energy and the vertical axis shows the radiation absorbance. The three energy characteristics shown in FIG. 5 correspond to the members 2A, 2B, and 2C in order from the upper side in FIG. 5, respectively. The energy characteristics of the radiation that passed through the members 2A through 2C are in the case where the radiation passed through the members individually. Therefore, as shown in FIG. 4, when the member 2B and the member 2C are overlaid on the member 2A, the energy characteristics of the radiation that passed through the specimen 2 are influenced by the members 2A through 2C, so that the energy characteristics shown in FIG. 5 are superimposed.

When an image of the specimen 2 is formed by using the threshold-based count acquired with one signal discrimination threshold, all radiation photons with energy values equal to or more than the energy value corresponding to the signal discrimination threshold are counted, so that the energy characteristics of the radiation that passed through each of the members 2A through 2C cannot be discriminated.

On the other hand, in the images of the specimen 2 in the energy windows $W_1$ through $W_N$ formed by using the regional counts $A_1$ through $A_N$, the detection energy regions are restricted, so that according to the respective energy windows $W_1$ through $W_N$, the energy characteristic differences of the radiation that passed through the members 2A through 2C are reflected. Therefore, by applying arithmetic operation processing using so-called four arithmetic operations to the regional image data composing the images of the specimen 2 of the energy windows $W_1$ through $W_N$, energy characteristics of the radiation that passed through the members 2A through 2C can be extracted. The energy characteristics are determined according to the materials of the members 2A through 2C, so that by applying the predetermined arithmetic operation processing to regional image data of the energy windows $W_1$ through $W_N$ as described above, material information of the specimen 2, specifically, material identifying image data containing extracted material information of the portions made of different materials of the specimen 2 can be acquired. The arithmetic operation processing using the four arithmetic operations is, for example, subtraction, addition, multiplication, or division, or a combination of these.

Next, the threshold setting section 50 which is one of the features of the radiation detecting device 4 will be described in detail.

As shown in FIG. 1, the threshold setting section 50 of the signal processing section 20 sets N signal discrimination thresholds $T_1$ through $T_N$ so that the regional counts $A_1$ through $A_N$ of the energy windows $W_1$ through $W_N$ when detecting reference radiation (hereinafter, also referred to as "reference regional counts $A_{1(B)}$ through $A_{N(B)}$") become substantially equal, and includes a threshold controller 51 and a count comparator 52.

The threshold controller 51 sets signal discrimination thresholds which should be input into the signal discriminating section 40, and generates voltage signals of reference voltage values corresponding to the signal discrimination thresholds and inputs these into the signal discriminating section 40. The count comparator 52 judges whether threshold-based counts corresponding to the signal discrimination thresholds input into the signal discriminating section 40 coincide with a predetermined value.

The threshold setting section 50 sets N signal discrimination thresholds $T_1$ through $T_N$ in order by using the comparison result of the count comparator 52 while changing the signal discrimination threshold to be input into the signal discriminating section 40 by the threshold controller 51. This will be described in detail.

Figure 6:
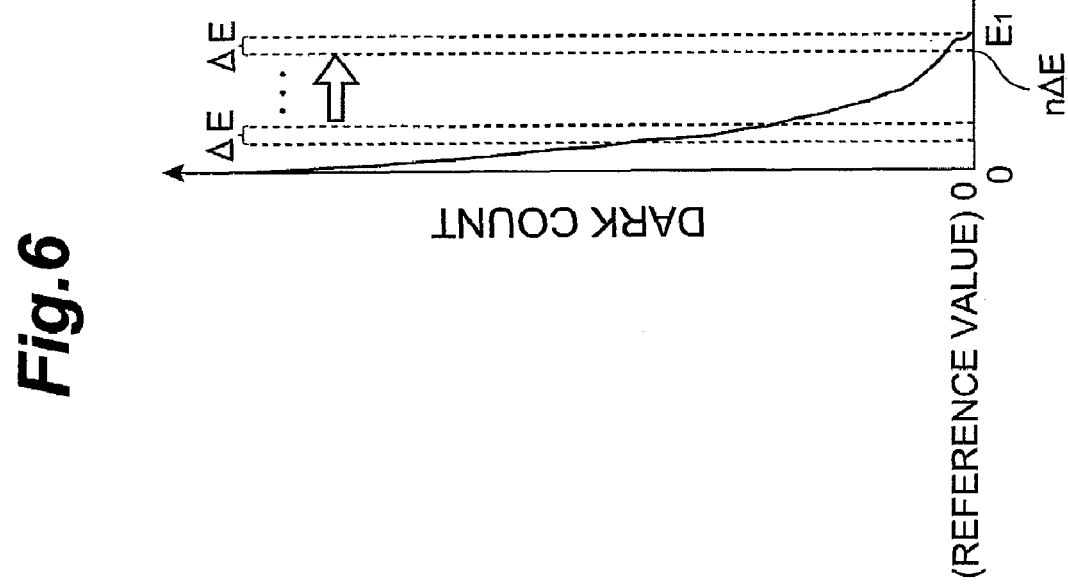
FIG. 6 is an outline diagram of a step of setting a first signal discrimination threshold.

First, the threshold setting section 50 sets a first signal discrimination threshold $T_1$. This first signal discrimination threshold $T_1$ is for discriminating a radiation count (hereinafter, referred to as "dark count") $C_d$ caused by pulse signals output from the radiation detecting section 10 due to the influence of a dark current, etc., from the radiation counts when detecting radiation, and corresponds to the minimum energy value $E_1$ among the energy values $E_1$ through $E_N$. FIG. 6 is a view showing a step of setting the first signal discrimination threshold. The horizontal axis shows energy and the vertical axis shows the dark current value.

The threshold controller 51 acquires the dark count $C_d[T]$ while, for example, increasing the signal discrimination threshold T in units of increment threshold $\Delta T$ from the value corresponding to the energy value 0. This corresponds to sweeping of the energy value in increment thresholds of, for example, $\Delta E$ from 0 as shown in FIG. 6.

The count comparator 52 compares a dark count $C_d[T_{n\Delta E}]$ acquired when the signal discrimination threshold $T_{n\Delta E}$ corresponding to an energy value $n\Delta E$ (n: integer of 1 or more) is set and a reference value (0 in FIG. 6) set in advance with each other. When the count comparator 52 judges that $C_d[T_{n\Delta E}]$ is equal to or less than the reference value, the threshold controller 51 determines the signal discrimination threshold $T_{n\Delta E}$ set in the signal discriminating section 40 as the first signal discrimination threshold $T_1$.

Figure 7:
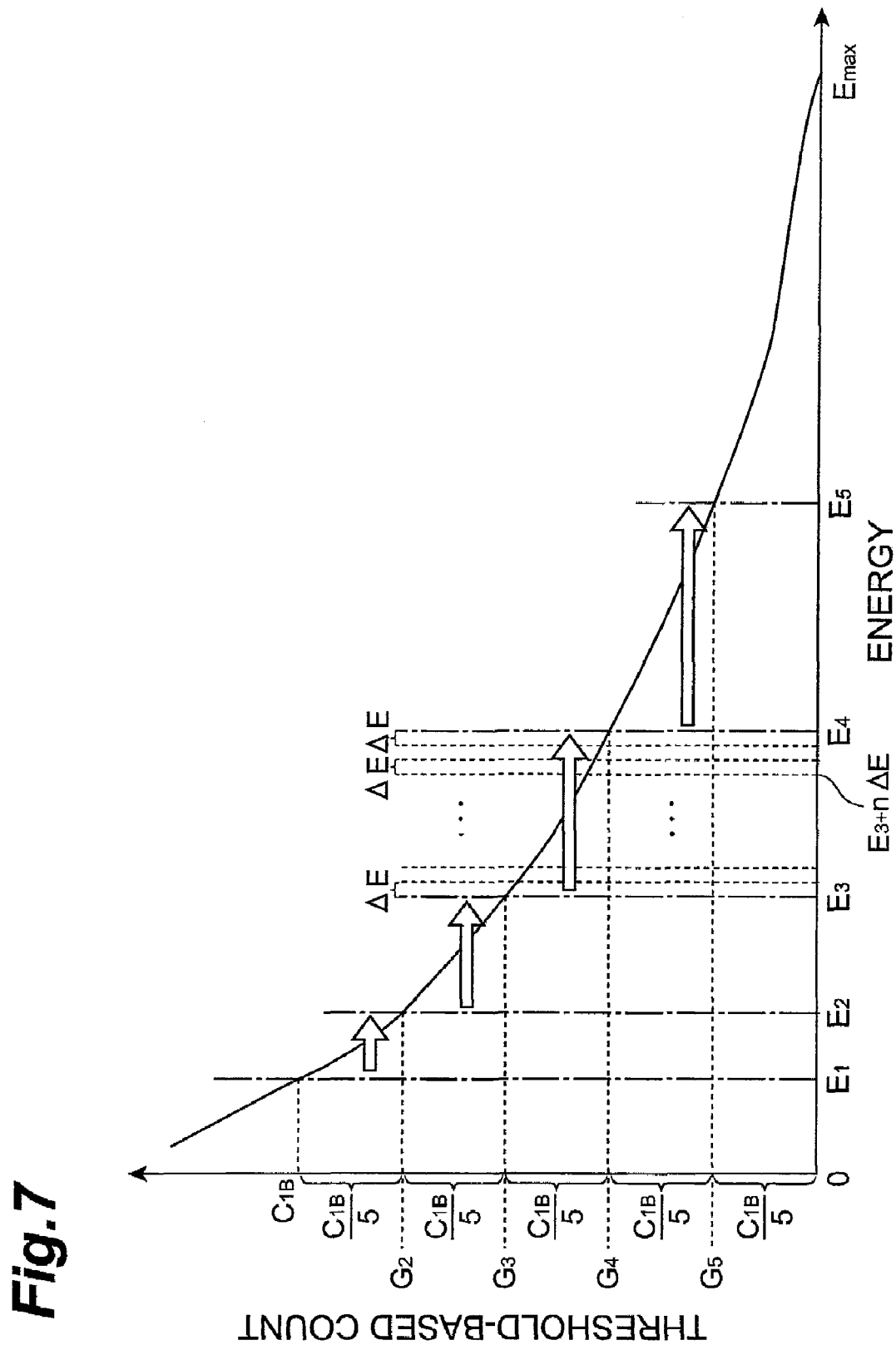
FIG. 7 is an outline diagram of a step of setting second through N-th signal discrimination thresholds.

Next, as shown in FIG. 7, the threshold setting section 50 sets second through N-th signal discrimination thresholds $T_2$ through $T_N$ by using the threshold-based count $C[T_1]$ (hereinafter, also referred to as "reference count $C_{1B}$") acquired in response to detection of reference radiation in the state where the first signal discrimination threshold $T_1$ is set in the signal discriminating section 40. FIG. 7 is a view showing a step of setting the second through N-th signal discrimination thresholds. In FIG. 7, N is set to 5. The horizontal axis shows energy, and the vertical axis shows a threshold-based count.

Setting of the m-th signal discrimination threshold $T_m$ (m: integer of 2 to N) will be described. The energy value corresponding to the m-th signal discrimination threshold $T_m$ is defined as $E_m$.

The threshold controller 51 increases the signal discrimination threshold of the signal discriminating section 40 in increments of increment threshold $\Delta T$ from the (m−1)th signal discrimination threshold $T_{m-1}$. The count comparator 52 compares the threshold-based count $C[T_m+n\Delta T]$ when the signal discrimination threshold is $T_m+n\Delta T$ and a target value (predetermined value) $G_m$ expressed by the following equation.

$$G_m = C_{1B} - (m-1)R \quad \text{[Equation 1]}$$

In Equation (1), R is a value obtained by dividing the reference count $C_{1B}$ by the number of energy windows (herein, N) to be set. Hereinafter, this R is referred to as a regulated value.

The threshold controller 51 sets a signal discrimination threshold $(T_m+n\Delta T)$ when the count comparator 52 judges that the threshold-based count $C[T_m+n\Delta T]$ and the target value $G_m$ substantially coincide with as the m-th signal discrimination threshold $T_m$. Setting of the m-th signal discrimination threshold $T_m$ is repeated until m reaches N, whereby second through N-th signal discrimination thresholds $T_2$ through $T_N$ are set.

The target value $G_m$ expressed by Equation (1) is for setting the difference between the threshold-based count $C[T_{m-1}]$ acquired with the (m−1)th signal discrimination threshold $T_{m-1}$ and the threshold-based count $C[T_m]$ acquired with the m-th signal discrimination threshold $T_m$ to the regulated value R.

Therefore, by setting second through N-th signal discrimination thresholds by comparing the threshold-based counts with respect to signal discrimination thresholds changed in increments of increment threshold $\Delta T$ and the target value $G_m$, the reference regional counts $A_{1(B)}$ through $A_{N(B)}$ become almost equal to the regulated value R. Therefore, by the threshold setting section 50, signal discrimination thresholds $T_1$ through $T_N$ for substantially equalizing the reference regional counts $A_{1(B)}$ through $A_{N(B)}$ can be set.

Herein, regarding the regional counts $A_1$ through $A_N$, signal discrimination threshold $(T_m+n\Delta T)$ when the threshold-based count $C[T_m+n\Delta T]$ and the target value $G_m$ substantially coincide with each other is set as the m-th signal discrimination threshold $T_m$, however, when they do not coincide with each other, setting is made as follows. That is, a threshold-based count closer to the target value $G_m$ of threshold-based counts acquired with signal discrimination thresholds before and after the signal discrimination threshold $(T_m+n\Delta T)$ is set as the m-th signal discrimination threshold. The reference regional counts $A_{1(B)}$ through $A_{N(B)}$ are preferably in the range of $R\pm(\frac{1}{2})R$ with respect to the regulated value R, and more preferably, in the range of $R\pm(\frac{1}{10})R$. For example, when the regulated value R is 2000, the reference regional counts $A_{1(B)}$ through $A_{N(B)}$ are preferably values of 1000 to 3000, and more preferably, 1800 to 2200.

Setting of the signal discrimination thresholds $T_1$ through $T_N$ by the threshold setting section 50 can be performed by using one wave height discriminator among the wave height discriminators $42_1$ through $42_N$ of the discriminator units 41.

In this case, into the wave height discriminators other than the wave height discriminator to be used, a signal discrimination threshold which does not cause generation of output pulse signals is input. Such a signal discrimination threshold which does not cause generation of output pulse signals is, for example, a signal discrimination threshold corresponding to the maximum energy value $E_{max}$. Then, after determining the signal discrimination thresholds $T_1$ through $T_N$ by using one wave height discriminator, the signal discrimination thresholds $T_1$ through $T_N$ are set in the wave height discriminators $42_1$ through $42_N$, respectively.

The wave height discriminators $42_1$ through $42_N$ to which the signal discrimination thresholds $T_1$ through $T_N$ are assigned can also be used for setting. In this case, for example, when the m-th signal discrimination threshold $T_m$ is set, a signal discrimination threshold which does not cause generation of output pulse signals is input into the wave height discriminators other than the wave height discriminator $42_m$.

Figure 8:
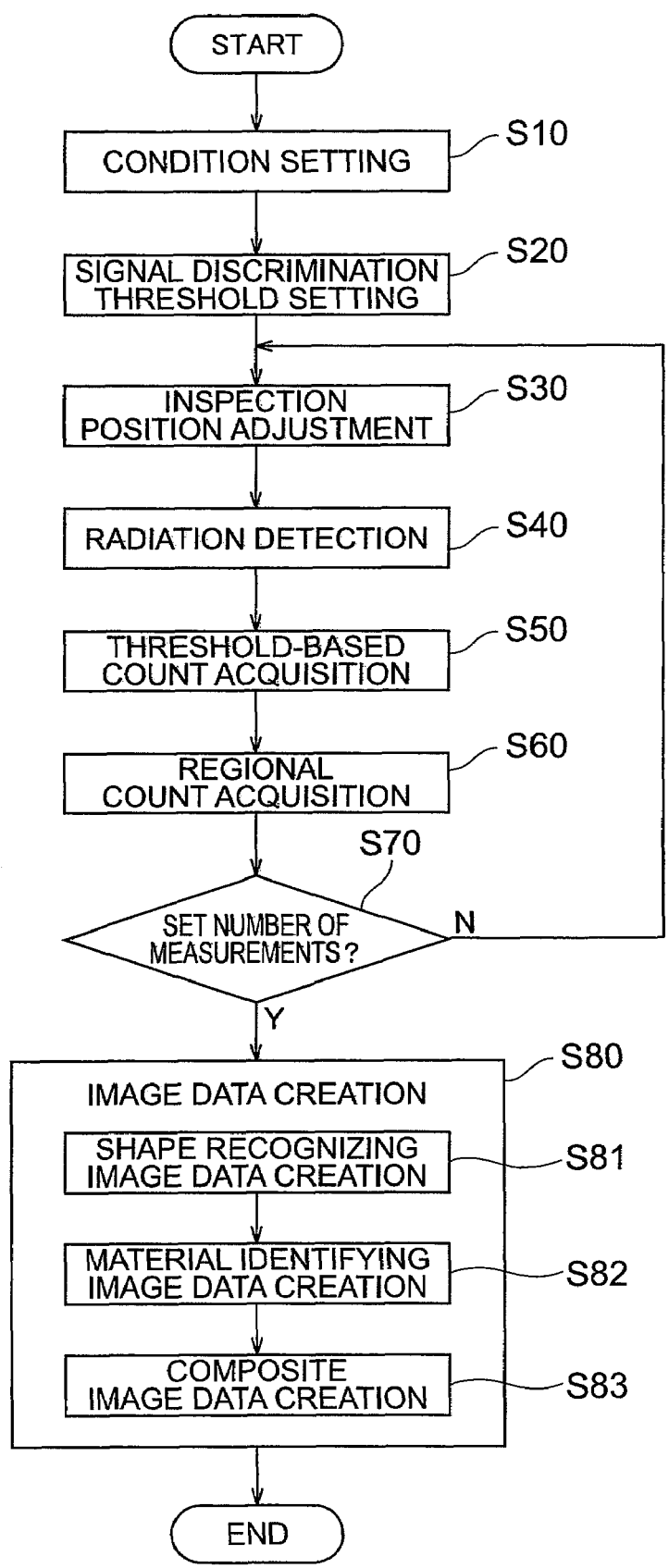
FIG. 8 is a flowchart of an embodiment of the radiation detection method of the present invention.

Next, a radiation detection method using the radiation detecting device 4 when performing a non-destructive inspection of the specimen 2 with the non-destructive inspection system 1 will be described with reference to FIG. 8. FIG. 8 is a flowchart of an embodiment of the radiation detection method of the present invention.

At Step S10, conditions necessary for radiation detection are input into the signal processing section 20 of the radiation detector 6 through the input part 7A of the control device 7. Herein, the conditions to be input are the set number of signal discrimination thresholds, a reference value when setting the first signal discrimination threshold $T_1$, the number of measuring lines (number of measurements), the accumulation time of output pulse signals in the counting section 60, and the increment threshold $\Delta T$, etc.

Figure 9:
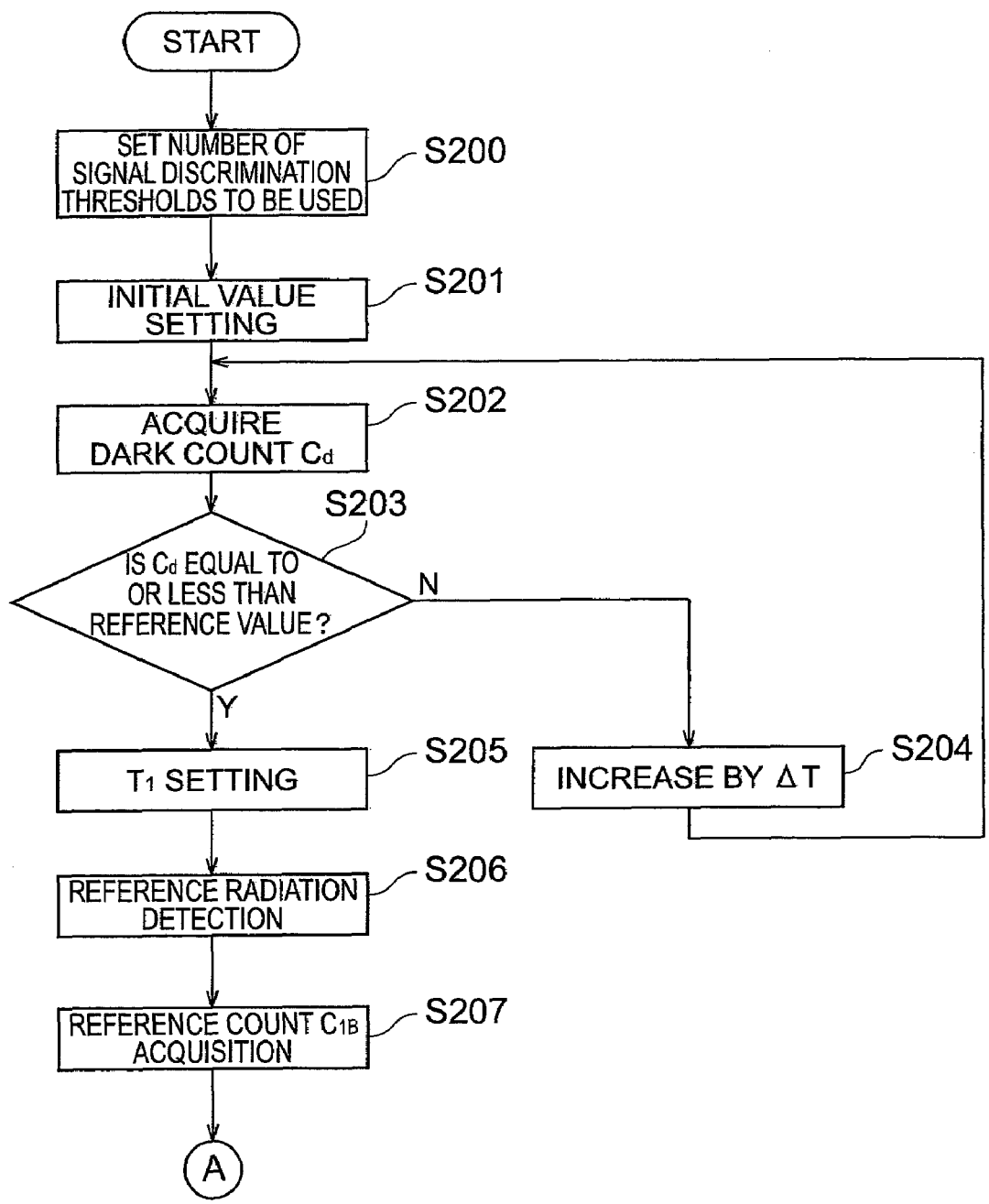
FIG. 9 is a flowchart of a step of setting the first through N-th signal discrimination thresholds.
Figure 10:
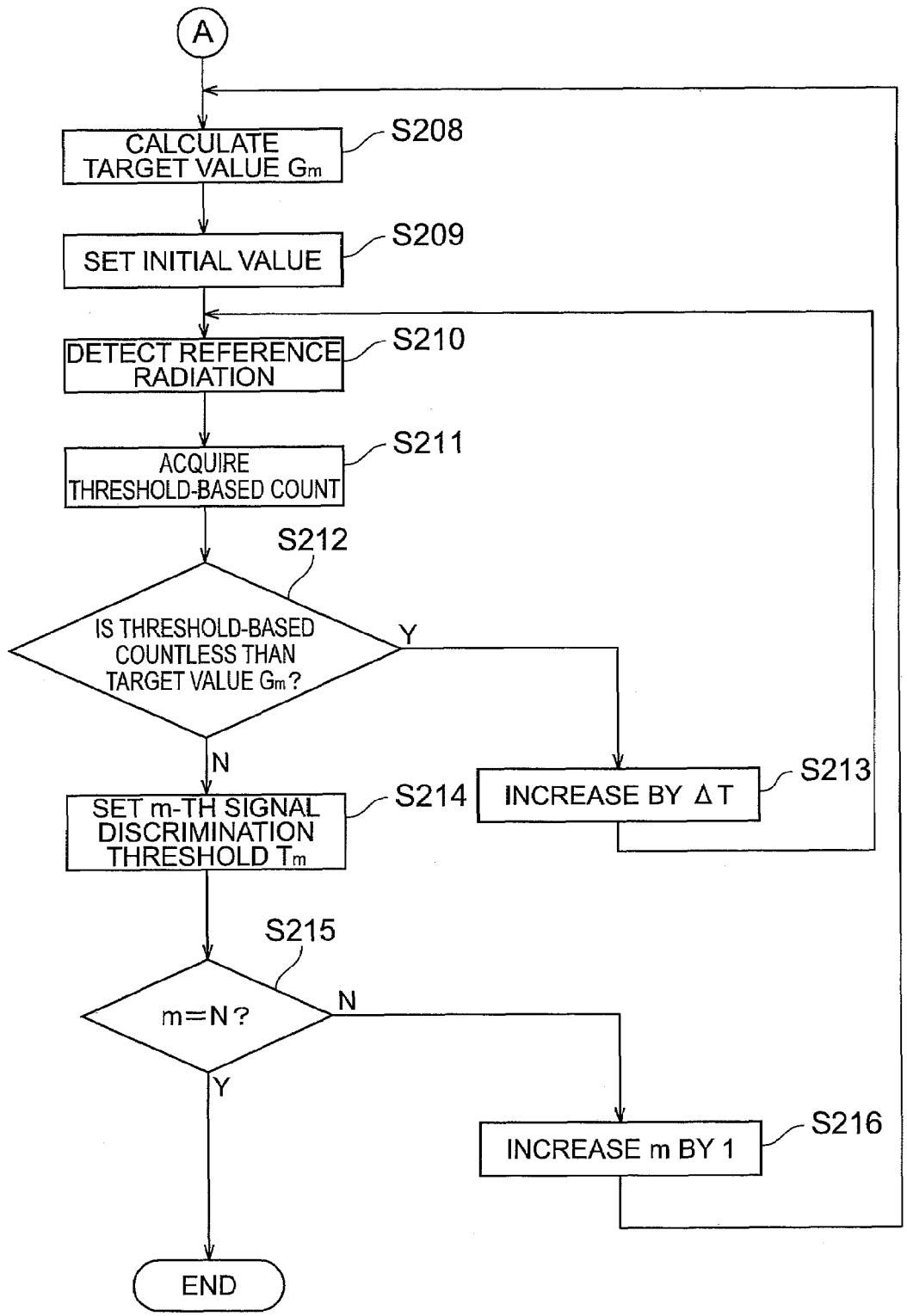
FIG. 10 is a flowchart of a step of setting the first through N-th signal discrimination thresholds continued from FIG. 9.

At the next Step S20, signal discrimination thresholds are set. A method for setting the signal discrimination thresholds will be described with reference to FIG. 9 and FIG. 10. FIG. 9 and FIG. 10 are flowcharts showing a method for setting first through N-th signal discrimination thresholds.

First, as shown in FIG. 9, at Step S200, the number of signal discrimination thresholds to be used is set among N signal discrimination thresholds $T_1$ through $T_N$. In other words, wave height discriminators $42_1$ through $42_N$ to be used are set. This setting can be made by the threshold setting section 50 based on the set number of signal discrimination thresholds input at Step S10 or made by an operator through the input part 7A. Description is given on the assumption that, for N wave height discriminators $42_1$ through $42_N$ of the discriminator units 41, corresponding signal discrimination thresholds $T_1$ through $T_N$ are set.

At Step S200, signal discrimination thresholds to be used are set, and then the first signal discrimination threshold $T_1$ is set (first setting step). In other words, at Step S201, the threshold controller 51 inputs a signal discrimination threshold $T_{1s}$ as an initial value for sweeping signal discrimination thresholds when setting the first signal discrimination threshold $T_1$ into the signal discriminating section 40. At this time, among the wave height discriminators $42_1$ through $42_N$ of the signal discriminating section 40, the signal discrimination threshold $T_{1s}$ is input into the wave height discriminator $42_1$, and a signal discrimination threshold which does not cause generation of output pulse signals is input into other wave height discriminators $42_2$ through $42_N$.

At Step S202, in the state where no radiation is irradiated from the radiation irradiating section 3, a radiation count (dark count) $C_d$ to be output from the counting section 60 is acquired. At Step S203, the count comparator 52 judges whether the dark count $C_d$ is the reference value or less. This judgment is made with respect to the output results from the plurality of radiation detecting elements 11 of the radiation detecting section 10. When the dark count $C_d$ is larger than the reference value (S203: "N"), at the Step S204, the signal discrimination threshold $T_{1s}$ is increased by the increment threshold $\Delta T$ and Steps S202 and S203 are repeated until the dark count $C_d$ becomes equal to or less than the reference value. When Steps S202 and S203 are repeated n times, $T_{1s}+n\Delta T$ has been input as a signal discrimination threshold in the signal discriminating section 40, and the dark count acquired at Step S203 is $C[T_{1s}+n\Delta T]$.

When the dark count $C_d$ is the reference value or less (S203: Y), at Step S205, the signal discrimination threshold ($T_{1s}+n\Delta T$) set in the wave height discriminator $42_1$ at this time is defined as the first signal discrimination threshold $T_1$ (first setting step).

Thereafter, at Step S206, radiation is irradiated from the radiation irradiating section 3 and reference radiation is detected by the radiation detecting section 10 (detection step, reference radiation detection step). Accordingly, as shown in Step S207, a reference count $C_{1B}$ as the reference-based count $C_1[T_1]$ with respect to the first signal discrimination threshold $T_1$ in the reference radiation is acquired. In detail, pulse signals (reference output signals) generated by detecting the reference radiation are discriminated by the first signal discrimination threshold $T_1$ by the signal discriminating section 40, and the discriminated pulse signals are counted by the counting section 60, whereby the reference count $C_{1B}$ is acquired (reference count acquisition step). The reference count $C_{1B}$ is stored in the storage section 70.

Next, second through N-th signal discrimination thresholds $T_2$ through $T_N$ are determined in order by detecting the reference radiation (second setting step). Generally, description is given on the assumption that the m-th signal discrimination threshold $T_m$ is determined (m-th threshold setting step).

As shown in FIG. 10, at Step S208, the target value $G_m$ is calculated. In other words, the target value $G_m$ is calculated by the arithmetic section 80 by using the reference count $C_{1B}$ stored in the storage section 70 and the Equation (1). The calculated target value $G_m$ is stored in the storage section 70. Next, at Step S209, the initial value of the m-th signal discrimination threshold $T_m$ is set to the previous (m−1)th signal discrimination threshold $T_{m-1}$ (for example, when m is 2, the first signal discrimination threshold) and input into the signal discriminating section 40. At this time, in the wave height discriminator $42_m$ in which the m-th signal discrimination threshold $T_m$ is set, the signal discrimination threshold $T_{m-1}$ as the initial value is input, and in other wave height discriminators, a signal discrimination threshold which does not cause generation of output pulse signals is input.

Next, at Step S210, the reference radiation is detected in the same manner as at Step S206. Accordingly, at Step S211, a threshold-based count $C[T_{m-1}]$ with respect to the (m−1)th signal discrimination threshold $T_{m-1}$ is acquired in the same manner as at Step S207.

At Step S212, the count comparator 52 compares the threshold-based count $C[T_{m-1}]$ and the target value $G_m$. This comparison is applied to the output results from the plurality of radiation detecting elements 11 of the radiation detecting section 10. When the threshold-based count $C[T_{m-1}]$ is less than the target value $G_m$ (S212: "Y"), as shown in Step S213, the signal discrimination threshold $T_{m-1}$ is set to a signal discrimination threshold ($T_{m-1}+\Delta T$) raised by the increment threshold $\Delta T$. Then, the steps S210 through S213 are repeated until the threshold-based count $C[T_{m-1}]$ reaches the target value $G_m$. When Steps 210 through S213 are repeated n times, at Step S210, $T_{ms}+n\Delta T$ is input as the signal discrimination threshold in the signal discriminating section 40, and the threshold-based count acquired at Step S211 is $C[T_{ms}+n\Delta T]$.

At Step S212, when the threshold-based count $C[T_{m-1}+n\Delta T]$ is equal to or more than the target value $G_m$ (S212: "N"), at Step S214, the m-th signal discrimination threshold $T_m$ is set as follows.

When the threshold-based count $C[T_{m-1}+n\Delta T]$ coincides with the target value $G_m$, the signal discrimination threshold $(T_{m-1}+n\Delta T)$ at this time is set as the m-th signal discrimination threshold $T_m$. When the threshold-based count $C[T_{m-1}+n\Delta T]$ is larger than the target value $G_m$, a threshold-based count $C[T_{m-1}+(n-1)\Delta T]$ acquired with the signal discrimination threshold that is just before $T_{m-1}+n\Delta T$, that is, smaller than increment threshold $\Delta T$ than $T_{m-1}+n\Delta T$ is compared with the threshold-based count $C[T_{m-1}+n\Delta T]$, and a signal discrimination threshold corresponding to the threshold-based count closer to the target value $G_m$ is set as the m-th signal discrimination threshold $T_m$.

Next, at Step S215, when N signal discrimination thresholds $T_1$ through $T_N$ are not set ("N" at S215), at Step S216, the following signal discrimination threshold setting is performed by adding 1 to m. Then, by repeating Steps S208 through S216 until N signal discrimination thresholds $T_1$ through $T_N$ are determined, N signal discrimination thresholds $T_1$ through $T_N$ are set. In the description given above, when setting the signal discrimination thresholds $T_2$ through $T_N$, the target value $G_m$ was set, however, it is also allowed that, for example, at Step S208, target values $G_2$ through $G_N$ are calculated and stored in the storage section 70. In this case, after Step S216, the process returns to Step S209. The calculation of the target value $G_m$ is performed before it is used at S212 after Step S207.

Step S20 and subsequent steps will be described again with reference to FIG. 8. At Step S30, the specimen 2 is arranged between the radiation irradiating section 3 and the radiation detecting section 6, and the inspection position of the specimen 2 is adjusted by using the position adjusting means 5. Then, at Step S40, radiation is irradiated from the radiation irradiating section 3 and radiation that passed through the specimen 2 is detected (detection step).

Accordingly, as shown in Step S60, threshold-based counts $C[T_1]$ through $C[T_N]$ and regional counts $A_1$ through $A_N$ with respect to the N signal discrimination thresholds $T_1$ through $T_N$ are acquired (counting processing step).

In detail, when the radiation detecting elements 11 of the radiation detecting section 10 detect the radiation (detection step), the amplifying section 30 amplifies pulse signals output from the respective radiation detecting elements 11 and inputs the amplified pulse signals into the signal discriminating section 40. The wave height discriminators $42_1$ through $42_N$ of the signal discriminating section 40 generate output pulse signals by discriminating the input amplified pulse signals by the signal discrimination thresholds $T_1$ through $T_N$ (signal discrimination step), and outputs these to the counting section 60. The counting section 60 acquires threshold-based counts $C[T_1]$ through $C[T_N]$ by counting output pulse signals input from the signal discrimination thresholds $T_1$ through $T_N$ (counting step). Then, the arithmetic section 80 calculates regional counts $A_1$ through $A_N$ as radiation counts in the energy windows $W_1$ through $W_N$ from the threshold-based counts $C[T_1]$ through $C[T_N]$ (arithmetic operation step).

Next, at Step S70, it is judged whether the number of measurements (number of measuring lines) has reached the number set at Step S10 (number of measuring lines). When it does not reach the set number (S70: "N"), Steps S30 through S70 are repeated until reaching the number of measurements (number of measuring lines) while scanning the specimen S by changing the inspection position of the specimen 2 by the position adjusting means 5. Data acquired in the measurements are recorded on the storage section 70. The judgment at Step S70 may be made by the controller 7C of the control device 7 or may be made by an operator.

At Step S70, when it is judged that the number of measurements has reached the set number (S70: "Y"), at Step S80, the arithmetic section 80 creates image data for forming an image of the specimen 2 (image data creation step). In other words, at Step S81, the arithmetic section 80 creates shape recognizing image data by using the reference count $C_{1B}$ (shape recognizing image data creation step). In addition, at Step S82, regional image data in the energy windows $W_1$ through $W_N$ are created based on the regional counts $A_1$ through $A_N$ (regional image data creation step), and then material identifying image data is created by applying arithmetic operation processing for material identification to the plurality of regional image data (material identifying image data creation step). Further, at Step S83, by superimposing the material identifying image data on the shape recognizing image data, composite image data is created (composite image data creation step). Then, the arithmetic section 80 outputs the composite image data to the output part 7B of the control device 7 from the signal processing section 20, and the output part 7B displays a composite image composed of the composite image data.

In the description given above, Step S82 is performed after Step S81, however, this order may be reversed, or these may be performed concurrently. The composite image data is output to the output part 7B and the composite image is displayed, however, it is also possible that the regional image data, shape recognizing image data, and material identifying image data are output to the output part 7B and images of the specimen 2 in the energy windows $W_1$ through $W_N$, the shape recognizing image, and the material identifying image are displayed by the output part 7B. Further, herein, after the number of measurements setting at step S10 (number of measuring lines) are finished, based on data acquired through the measurements, respective image data, that is, regional image data, shape recognizing image data, material identifying image data, and composite image data are formed at Step S80, however, it is also allowed that each time when one measuring line is measured, the respective image data of this measuring line are created.

Next, action and effects of the radiation detecting device 4 and the radiation detection method will be described.

In the radiation detecting device 4 and the radiation detection method using the radiation detecting device, when the radiation detecting section 10 detects radiation, by discriminating pulse signals generated in the radiation detecting section 10 by the signal discrimination thresholds $T_1$ through $T_N$, radiation counts (regional counts) $A_1$ through $A_N$ in the respective energy windows $W_1$ through $W_N$ are acquired at a time. In such energy discrimination type detection, it is important that N signal discrimination thresholds $T_1$ through $T_N$ are set by the threshold setting section 50 so that the regional counts $A_1$ through $A_N$ of reference radiation become substantially equal.

The effect of setting of the signal discrimination thresholds $T_1$ through $T_N$ so that the regional counts $A_1$ through $A_N$ when detecting reference radiation become substantially equal as described above will be described in comparison with setting of a plurality of energy windows so that their energy widths become substantially equal.

As described above, the reference radiation has the energy characteristics, for example, as shown in FIG. 3. Therefore, if a plurality of energy windows are set so that the energy widths are substantially equal, regional counts in the energy windows of the reference radiation become unequal according to the energy characteristics. In this case, the reference radiation is to be irradiated onto a specimen, so that when inspecting the specimen, the detection sensitivity differs among the energy windows. Generally, the fluctuation per statistic Q (quantum noise) is in proportion to the reciprocal of the square root of the statistic Q, so that when the regional counts in the energy windows of the reference radiation are different as described above, quantum noise differences among the energy windows increase. As a result, when radiation that passed through the specimen is detected and images in the energy windows are formed, the image quality differs among the images. Further, when the arithmetic operation processing is applied to the plurality of regional image data for creating the material identifying image data, the influence of noise in the material identifying image tends to further increase.

Figure 11:
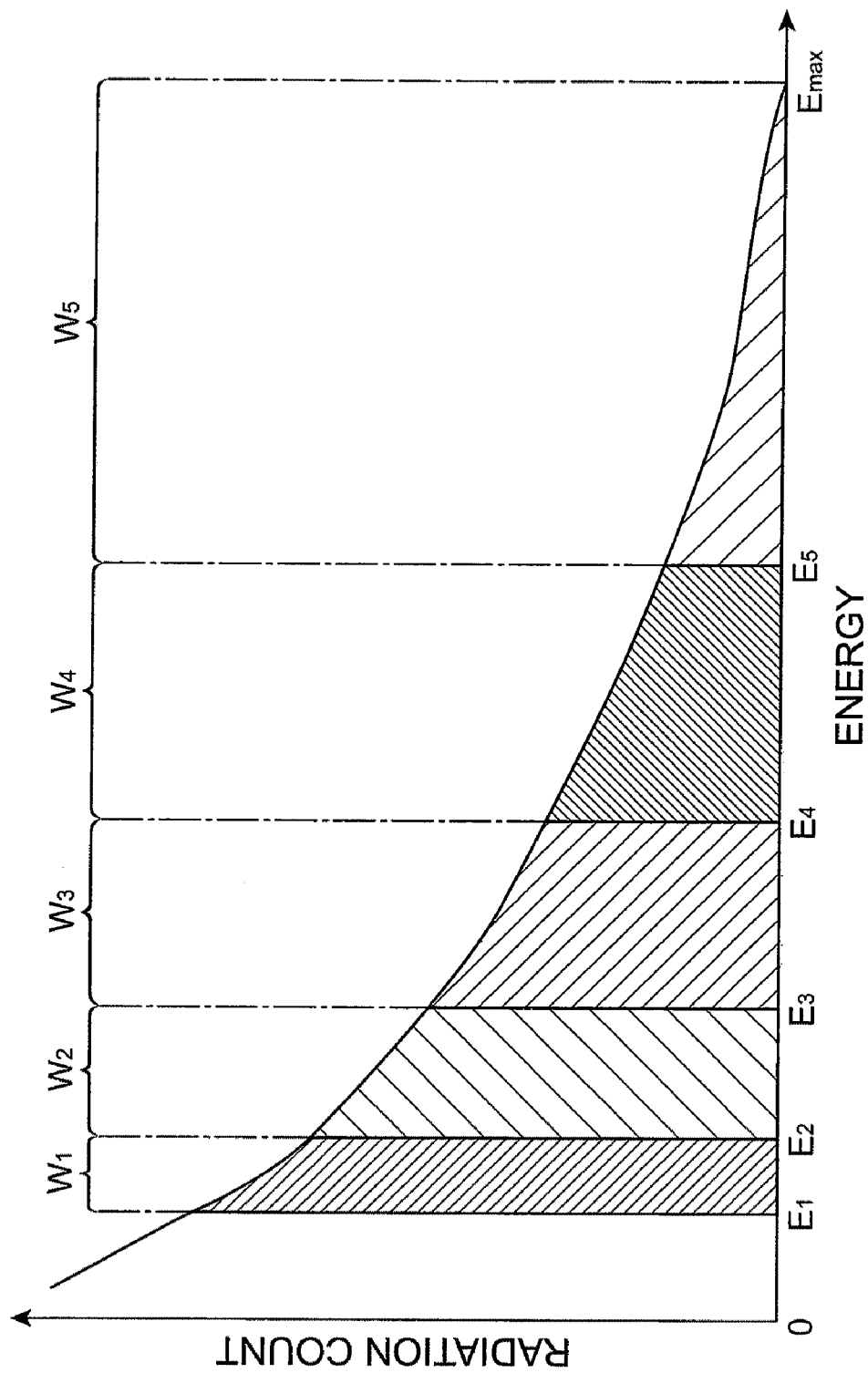
FIG. 11 is a view showing an example of setting of a plurality of energy regions.

On the other hand, in the radiation detector 6, as shown in FIG. 11, signal discrimination thresholds $T_1$ through $T_N$ are set by the threshold setting section 50 so that the plurality of energy windows $W_1$ through $W_N$ areas (hatched areas in FIG. 11) are substantially equal to each other (that is, the reference regional counts $A_{1(B)}$ through $A_{N(B)}$ are substantially equal to each other) in the energy characteristics of the reference radiation.

In other words, as described above, the threshold setting section 50 sets the first signal discrimination threshold $T_1$ to reduce the influence of the dark count $C_d$. Then, the reference count $C_{1B}$ is acquired by discriminating the reference output signals as the pulse signals generated by detecting the reference radiation by the radiation detecting section 10 by the first signal discrimination threshold $T_1$. Subsequently, among the second signal discrimination thresholds $T_2$ through $T_N$, in the setting of the m-th signal discrimination threshold $T_m$, the signal discrimination threshold $(T_m+n\Delta T)$ when the threshold-based count $C[T_m+n\Delta T]$ substantially coincides with the target value $G_m$ while changing the signal discrimination threshold (while sweeping the energy value) is set as the m-th signal discrimination threshold $T_m$.

The target value $G_m$ is determined so that the regional counts $A_1$ through $A_N$ of the plurality of energy windows $W_1$ through $W_N$ when detecting the reference radiation substantially coincide with the regulated value R, so that the regional counts $A_1$ through $A_N$ of the reference radiation are substantially equalized.

As described by using the flowchart shown in FIG. 10, when the threshold-based count $C[T_m+n\Delta T]$ does not coincide with the target value $G_m$, a signal discrimination threshold for the threshold-based count closer to the target value $G_m$ of the threshold-based counts acquired with the signal discrimination thresholds before and after the signal discrimination threshold $(T_m+n\Delta T)$ is selected. Even in this case, the reference regional counts $A_{1(B)}$ through $A_{N(B)}$ are closer to the regulated value R than in the case where a plurality of energy windows are set at even energy intervals, so that the reference regional counts $A_{1(B)}$ through $A_{N(B)}$ are substantially equalized.

In the non-destructive inspection of the specimen 2, the reference radiation is to be irradiated onto the specimen 2, so that by substantially equalizing the regional counts $A_1$ through $A_N$ of the reference radiation, the radiation that passed through the specimen 2 can be detected with the detection sensitivity substantially equal among the energy regions $W_1$ through $W_N$. As a result, image qualities of the images (regional images) of the specimen 2 formed from the regional image data created in the energy regions $W_1$ through $W_N$ are substantially equal.

This equalization of the image qualities of the images in the energy windows $W_1$ through $W_N$ will be described in detail based on experiment results. FIG. 12 are views corresponding to images of the specimen in three energy windows $W_1$ through $W_3$ when the reference regional counts in the energy windows are substantially equal to each other. FIG. 12(a) is a view corresponding to an image of the specimen in the energy window $W_1$. FIG. 12(b) is a view corresponding to an image of the specimen in the energy window $W_2$. FIG. 12(c) is a view corresponding to an image of the specimen in the energy window $W_3$. The conditions when acquiring the images of FIG. 12 are as follows.

The radiation irradiating section 3 was an X-ray tube, and an X-ray with energy characteristics shown in FIG. 3 was output with a tube voltage of 150 keV. The radiation detecting section 10 was a line sensor in which 64 radiation detecting elements 11 using $C_dTe$ were aligned. The discriminator units of the signal discriminating section 40 were three wave height discriminators $42_1$ through $42_3$, and corresponding three energy windows $W_1$ through $W_3$ were set.

Then, according to the method described with reference to FIG. 8 through FIG. 10 (in particular, FIG. 9 and FIG. 10), the first through third signal discrimination thresholds $T_1$ through $T_3$ were set so that the regional counts $A_1$ through $A_3$ of the reference radiation substantially coincide with each other. Energy values corresponding to the first through third signal discrimination thresholds $T_1$ through $T_3$ thus set in actuality were 20 keV, 45 keV, and 75 keV.

Accordingly, the energy region from 20 keV to 45 keV was set as the energy window $W_1$, the energy region from 45 keV to 75 keV was set as the energy window $W_2$, and the energy region from 75 keV to 150 keV was set as the energy window $W_3$. After thus setting the energy windows $W_1$ through $W_3$ as detection energy regions, the images of the specimen 2 were formed by performing Step S20 and subsequent steps shown in FIG. 8.

As is clear from comparison of the energy widths of the energy windows $W_1$ through $W_3$, when the signal discrimination thresholds $T_1$ through $T_3$ are set so that the radiation counts in the three energy windows $W_1$ through $W_3$ of the reference radiation substantially coincide with each other, the widths of the energy windows $W_1$ through $W_3$ are not equal, and in the above-described case, the width lengthens as the energy becomes higher. The reason for this is that, as described above, an X-ray with the energy characteristics shown in FIG. 3 was used as radiation. When comparing the three images of FIG. 12, it is found that the image qualities of the images are the same.

Figure 13:
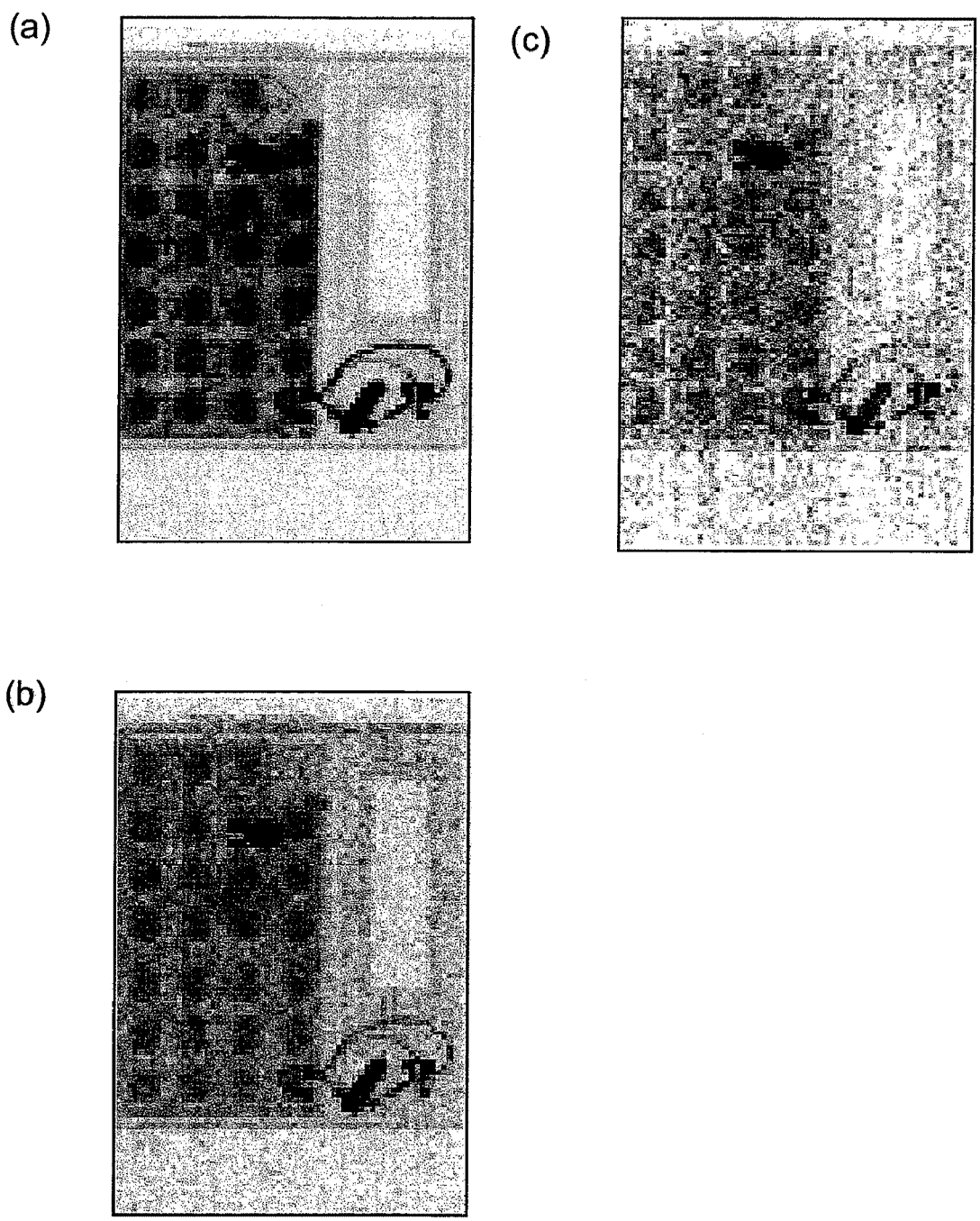
FIG. 13 are views corresponding to images of the specimen when the plurality of energy regions are divided at even energy intervals.

FIG. 13 are views corresponding to images in energy windows when the energy windows $W_1$ through $W_3$ were set so that the energy widths are equal to each other for comparison. FIG. 13(a) is a view corresponding to an image of the specimen in the energy window $w_1$. FIG. 13(b) is a view corresponding to an image of the specimen in the energy window $W_2$. FIG. 13(c) is a view corresponding to an image of the specimen in the energy window $W_3$.

Conditions for acquiring the views corresponding to the images of FIG. 13 are the same as in the case of acquiring the images of FIG. 12 except that the signal discrimination thresholds are set so that the energy widths of the energy windows are equal to each other. The energy values corresponding to the three signal discrimination thresholds when acquiring the images of FIG. 13 were set to 20 keV, 65 keV, and 105 keV. Accordingly, as the energy windows $W_1$, $W_2$, and $W_3$, energy regions of 20 keV to 65 keV, 65 keV to 105 keV, and 105 keV to 150 keV were set.

When the three images shown in FIG. 12 and the three images shown in FIG. 13 are compared with each other, it is found that the three images of FIG. 12 have the more equal image qualities in their right portions than in the three images shown in FIG. 13.

As described above, by setting the signal discrimination thresholds $T_1$ through $T_N$ so that the regional counts $A_1$ through $A_N$ in the energy windows $W_1$ through $W_N$ of the reference radiation become substantially equal, images of the specimen S in the energy windows $W_1$ through $W_N$ which are more equal in image quality can be obtained. Therefore, even when a material identifying image is formed by applying arithmetic operation processing (for example, difference processing) to the regional image data composing the images of the specimen 2 in the energy windows $W_1$ through $W_N$, image quality deterioration of the material identifying image can also be suppressed.

Then, as described above with reference to FIG. 8, when detecting radiation, N signal discrimination thresholds $T_1$ through $T_N$ are set for the radiation (reference radiation) to be output from the radiation irradiating section 3 before the specimen S is set. Therefore, when the radiation detector 6 is applied to the non-destructive inspection system 1, images of the specimen S with image qualities more equal to each other in the energy windows $W_1$ through $W_N$ can be reliably obtained.

The reference count $C_{1B}$ used when setting N signal discrimination thresholds $T_1$ through $T_N$ correspond to the number of all radiation photons having energy equal to or more than the minimum energy value $E_1$ in the reference radiation, and is the maximum value among the threshold-based counts. When setting the signal discrimination thresholds $T_1$ through $T_N$, the signal discrimination thresholds $T_1$ through $T_N$ are set so that the reference regional counts $A_{1(B)}$ through $A_{N(B)}$ reach the regulated value R (see Equation (1)) determined according to the reference count $C_{1B}$, so that deterioration of the detection sensitivities in the energy windows $W_1$ through $W_N$ can be reduced.

The detection energy regions are restricted, so that in comparison with the case where energy discrimination is not performed, the regional counts $A_1$ through $A_N$ counted in the energy windows $W_1$ through $W_N$ are reduced. Therefore, although the deterioration of the image qualities of the images in the energy windows $W_1$ through $W_N$ according to the reference radiation is prevented as described above, due to the influence of noise caused by lowering in number of data included in the regional image data for forming each image, the shapes of the portions made of different materials in the specimen 2 may blur. In this case, if arithmetic operation processing is applied to the plurality of regional image data for forming the material identifying image, their noises influence each other, so that it may become difficult to recognize the shape, etc., of the specimen 2 in the material identifying image.

On the other hand, the arithmetic section 80 of the radiation detecting device 4 further creates composite image data by superimposing the material identifying image data on the shape recognizing image data created based on the reference count $C_{1B}$. The reference count $C_{1B}$ corresponds to the number of all radiation photons excluding the dark count in the radiation detected by the radiation detecting section 10 as described above. Therefore, in the shape recognizing image formed based on the reference count $C_{1B}$, the shape of the specimen 2 can be reliably recognized. Therefore, by forming a composite image by superimposing the material identifying image on the shape recognizing image from the composite image data, shapes of portions of different materials included in the specimen 2 and material information of these portions can be reliably acquired.

Figure 14:
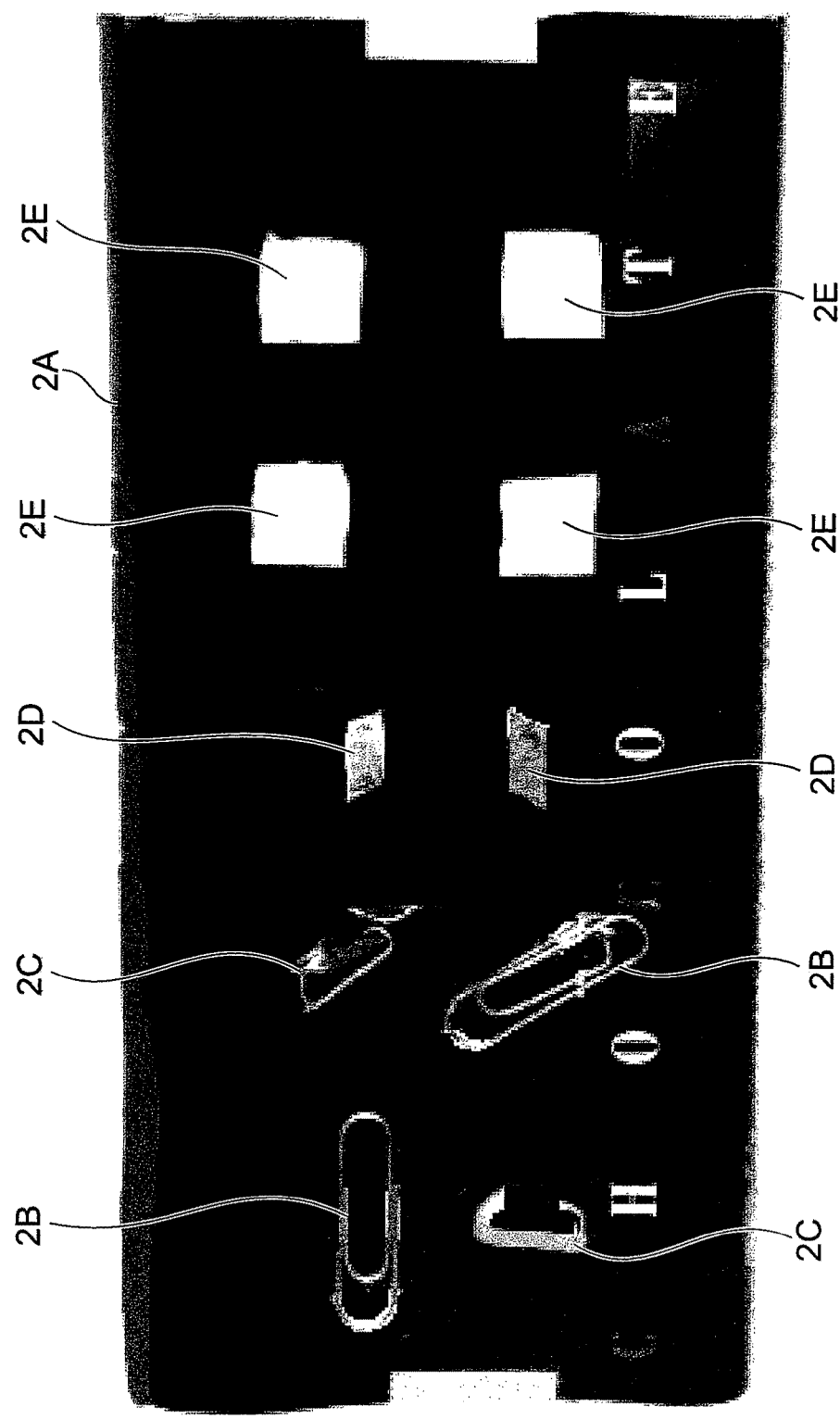
FIG. 14 is a view corresponding to a photo of a specimen used in the example.

The case where the specimen 2 shown in FIG. 14 is subjected to non-destructive inspection in actuality by using the radiation detection method shown in FIG. 8 through FIG. 10 by the non-destructive inspection system 1 will be described in detail by way of example.

As the specimen 2, as shown in FIG. 14, a clip, a staple, a razor blade, and a piece of eraser as foreign members 2B, 2C, 2D, and 2E were arranged on a chocolate bar as a member 2A. The radiation detecting section 10 of the radiation detector 6 was formed as a line sensor in which 64 radiation detecting elements 11 using $C_dTe$ are aligned. The radiation irradiating section 3 consisted of an X-ray tube which output an X-ray with a tube voltage of 150 keV.

Figure 15:
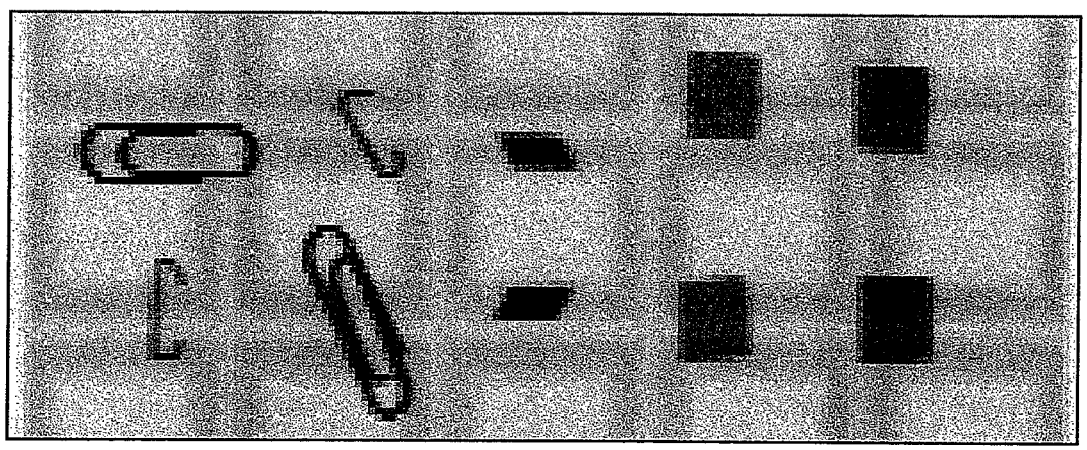
FIG. 15 is a view corresponding to a shape recognizing image of the specimen shown in FIG. 14.
Figure 17:
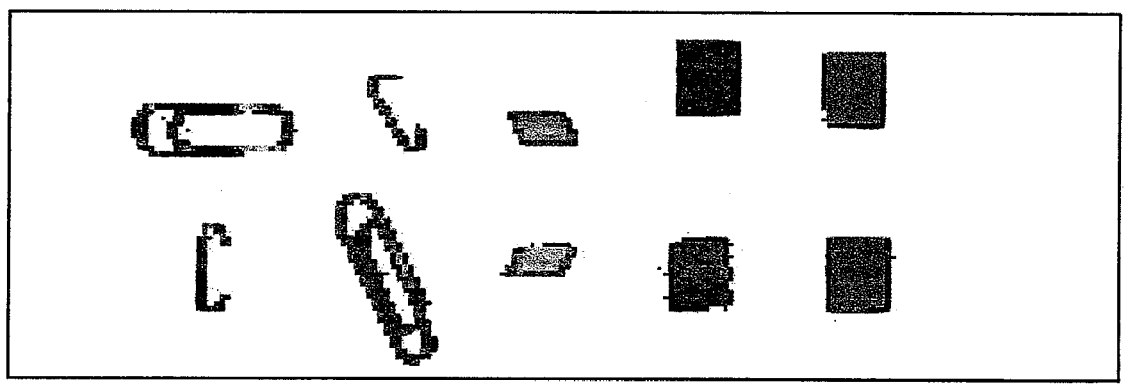
FIG. 17 is a view corresponding to a material identifying image of the specimen shown in FIG. 14.

FIG. 15 is a view corresponding to the shape recognizing image of the specimen shown in FIG. 14. FIG. 15 is formed based on a radiation count acquired in the energy region of 25 keV to 150 keV. FIG. 16 are views corresponding to images of the specimen shown in FIG. 14 in the respective energy windows. That is, FIG. 16($a$) is a view corresponding to an image of the specimen in an energy window of the energy region of 25 keV to 40 keV. FIG. 16($b$) is a view corresponding to an image of the specimen in an energy window of the energy region of 70 keV to 90 keV. FIG. 17 is a view corresponding to a material identifying image formed based on the two images of the specimen shown in FIG. 16. Further, FIG. 18 is a view corresponding to a composite image formed by superimposing the material identifying image shown in FIG. 16 on the shape recognizing image shown in FIG. 15.

As shown in FIG. 15, the image of the specimen 2 (shape recognizing image) formed based on the reference count $C_{1B}$ is a transmission image of the specimen 2, and in the image shown in FIG. 15, the shapes of the chocolate bar, the clip, the staple, the razor blade, and the piece of eraser can be recognized individually. However, in the image shown in FIG. 15, the materials of the specimen 2 cannot be identified.

On the other hand, by creating material identifying image data by applying arithmetic operation processing to the regional image data composing images of FIG. 16, as shown in FIG. 17, the material identifying image displayed by extracting material information of the specimen 2 can be obtained. The shades in FIG. 17 show extracted material information differences. For example, the reason for containing the same shade portion in the clip and the eraser is that the material information is extracted from only two images. Thus, even when material information was extracted from only two images, for example, the clip, the staple, the razor blade, and the piece of eraser could be clearly discriminated from the chocolate bar. However, as described above, the number of data in each regional image data to be used for creating the material identifying image data is small, so that in the material identifying image, as shown in FIG. 17, it is difficult to recognize the shape of the specimen 2, in particular, the chocolate bar as the member 2A.

Figure 18:
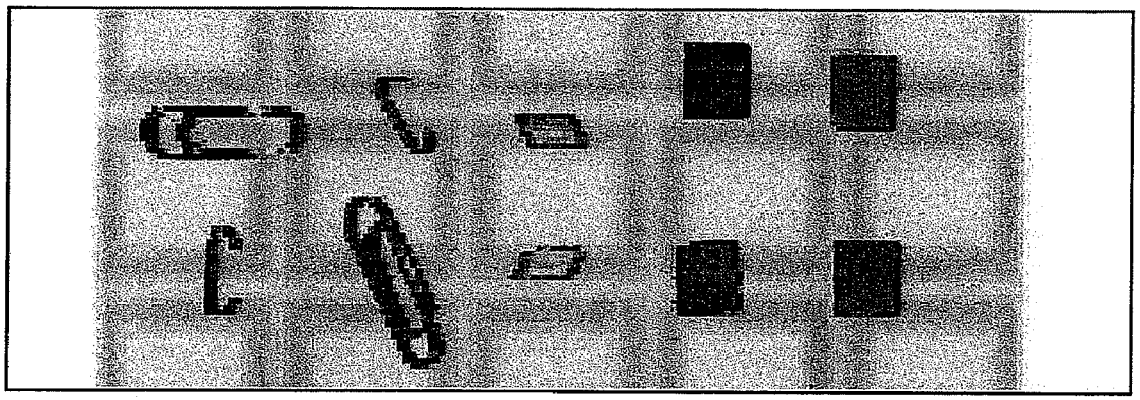
FIG. 18 is a view corresponding to a composite image of the specimen shown in FIG. 14.

On the other hand, as shown in FIG. 18, in the composite image formed from the composite image data composed of the shape recognizing image data and the material identifying image data, the material identifying image which identifies the material information is superimposed on the shape recognizing image from which the shapes can be reliably grasped and they are displayed, and as a result, the materials of the specimen 2 can be identified while confirming the shape of the specimen 2 and the portions of different materials included in the specimen 2.

An embodiment of the radiation detecting device and the radiation detection method is described above, however, the present invention is not limited thereto.

For example, in the above-described embodiment, at the time of setting in the signal discriminating section 40, after the (m−1)th signal discrimination threshold among the second through N-th signal discrimination thresholds $T_2$ through $T_N$ is determined once, by changing the signal discrimination threshold in increments of increment threshold, the next signal discrimination threshold (that is, the m-th signal discrimination threshold) is determined, however, the following way is also allowed.

That is, it is allowed that after setting the first signal discrimination threshold $T_1$, the threshold-based count distribution in all energy regions of the reference radiation is acquired by sweeping the signal discrimination threshold of the signal discriminating section 40 in increments of predetermined increment threshold $\Delta T$ from the first signal discrimination threshold $T_1$, and then N signal discrimination thresholds $T_1$ through $T_N$ are set based on the threshold-based count distribution.

Figure 19:
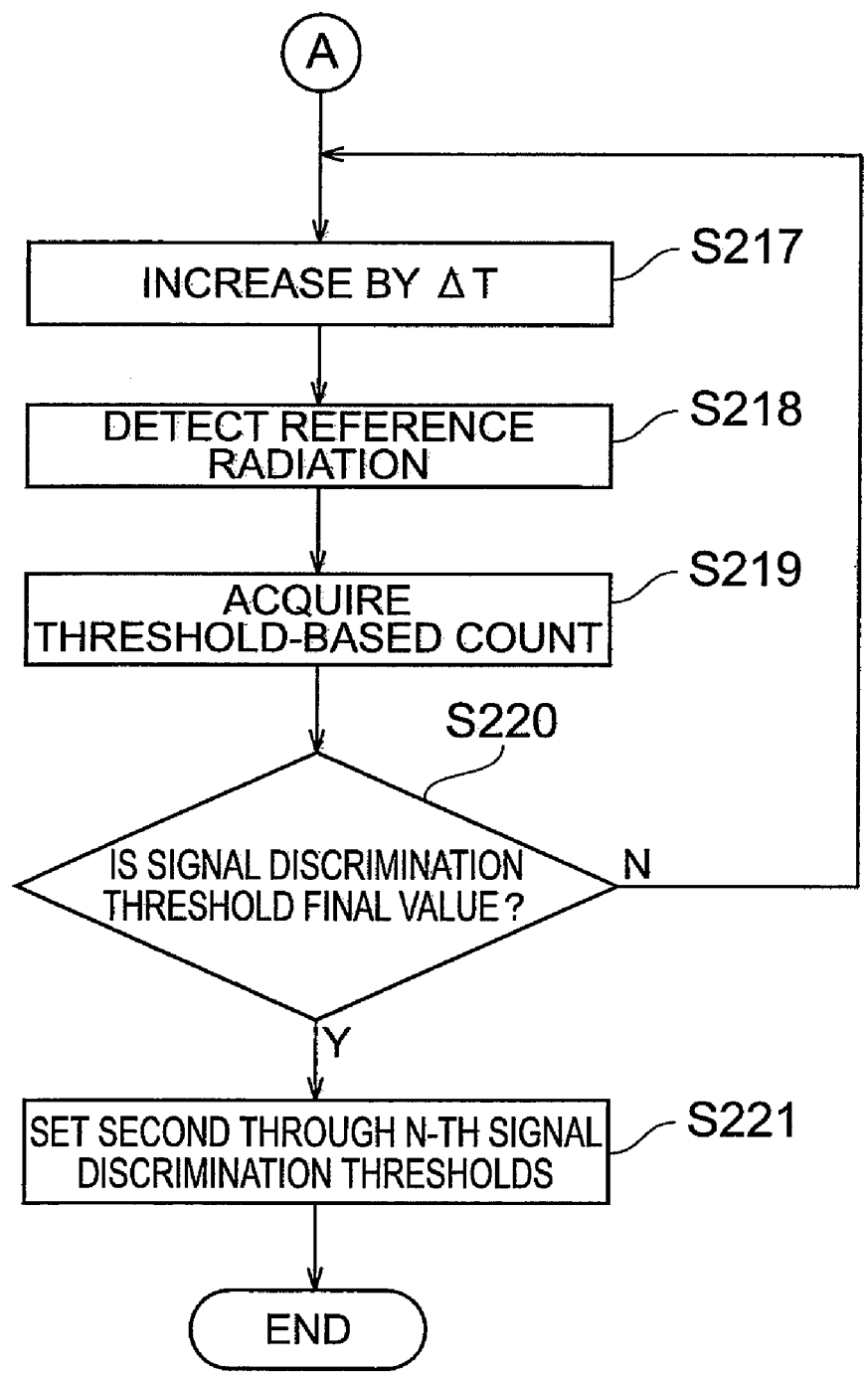
FIG. 19 is a flowchart of another embodiment of the radiation detection method of the present invention.

Detailed description will be described with reference to FIG. 8, FIG. 9, and FIG. 19. At Step S10 of FIG. 8, when inputting conditions, a maximum energy value $E_{max}$ and a corresponding signal discrimination threshold (final value) and an increment threshold $\Delta T$, etc., are set according to the energy regions of the radiation (reference radiation) output from the radiation irradiating section 3 to be used. Then, Step S20 is performed.

In other words, first, Steps S201 through S207 of FIG. 9 are performed. After finishing Step S207, at Step S217 shown in FIG. 19, the signal discrimination threshold is increased by $\Delta T$. Then, Steps S218 and S219 are performed in the same manner as Steps S210 and S211. At the next step S220, it is judged whether the signal discrimination threshold is the final value set at Step S10. When it is not the final value, Steps S217 through S220 are repeated until the signal discrimination threshold reaches the final value. In other words, while increasing the signal discrimination threshold in increments of increment threshold $\Delta T$, threshold-based counts are acquired with respect to the signal discrimination threshold. Accordingly, threshold-based count changes (threshold-based count distribution) in all energy regions of the reference radiation are acquired.

Then, at Step S211, based on the acquired threshold-based count, by setting signal discrimination thresholds $T_2$ through $T_N$ so that the regional counts $A_1$ through $A_N$ (reference regional counts $A_{1(B)}$ through $A_{N(B)}$) of the plurality of energy regions $W_1$ through $W_N$ of the reference radiation become substantially equal, N signal discrimination thresholds $T_1$ through $T_N$ are set.

When forming the image of the specimen S, after setting N signal discrimination thresholds $T_1$ through $T_N$ through Step S221, Step S30 and subsequent steps shown in FIG. 8 are performed.

In the above-described method, N signal discrimination thresholds $T_1$ through $T_N$ are set after acquiring all threshold-based counts in all energy regions while changing the signal discrimination threshold in increments of increment threshold, so that control of the signal processing section 20 is easy.

In addition, the radiation detecting section 10 was a line sensor, however, for example, it may be a two-dimensional sensor including two-dimensionally aligned radiation detecting elements 11. In this case, scanning of the specimen 2 as in the case of the line sensor is not necessary. However, even in this case, a plurality of measurements are preferable in terms of an increase in data amount and noise reduction.

Further, when setting the first signal discrimination threshold, it is not always necessary that the signal discrimination threshold is increased in order from the smaller one in increments of increment threshold $\Delta T$, and it is also allowed that a signal discrimination threshold larger than a supposed first signal discrimination threshold is set in advance and the signal discrimination threshold is lowered from this one. In this case, the dark count $C_d$ starts to be detected at a certain signal discrimination threshold, so that a signal discrimination threshold before the dark count $C_d$ is detected is set as the first signal discrimination threshold. When the dark count $C_d$ detected first while successively lowering the signal discrimination threshold is equal to or less than the reference value, the signal discrimination threshold at this time can be set as the first signal discrimination threshold.

When setting second through N-th signal discrimination thresholds $T_2$ through $T_N$, the signal discrimination thresholds can also be changed so as to lower. This is effective when, for example, a voltage value showing the maximum amplitude of the output pulse signals generated when the radiation detecting elements 11 of the radiation detecting section 10 detects radiation is not positive but negative. When this radiation detecting section 10 is used, the lower the signal discrimination threshold, the higher energy it corresponds to. In this case, the same method as described in FIG. 8 through FIG. 10 is applied except that the sweep direction of the signal discrimination threshold (energy value sweep direction) becomes reverse.

Further, in setting of first through N-th signal discrimination thresholds $T_1$ through $T_N$, the comparison between the radiation counts according to pulse signals (output pulse signals) discriminated by signal discrimination thresholds when sweeping the signal discrimination threshold (sweeping the energy value) and the target value $G_m$ or the reference value may be made by an operator by displaying radiation counts acquired with the swept signal discrimination thresholds on the output part 7B. When an operator thus makes judgment, the threshold setting section 50 does not necessarily have the count comparator 52, and may consist of the threshold controller 51.

In the above-described embodiment, the first signal discrimination threshold $T_1$ is for excluding the dark count $C_d$ from the detection results of radiation detection, however, it is not limited to this. For example, it is also possible that, when the dark count is sufficiently small or the dark count is excluded by using arithmetic operation processing, etc., the radiation count acquired by the signal discrimination threshold corresponding to zero energy is defined as the reference count and first through N-th signal discrimination thresholds are set in the same manner as in the method for setting second through N-th signal discrimination thresholds. In the above-described embodiment, the number of energy windows to be set and the number of signal discrimination thresholds coincide with each other, however, the present invention is not limited to this.

Further, in the above-described embodiment, the signal discrimination thresholds $T_1$ through $T_N$ are set each time of inspection of the specimen 2, however, when the same radiation irradiating section 3 is used, they may be set once. In this case, after setting, in FIG. 8, without performing Step S20, Step S30 and subsequent steps are performed after S10. The signal processing section 20 includes the threshold setting section 50, however, the present invention is not limited to this. In other words, the signal processing section 20 is only required to discriminate pulse signals output from the radiation detecting section 10 by using signal discrimination thresholds $T_1$ through $T_N$ set so that the reference regional counts $A_{1(B)}$ through $A_{N(B)}$ are substantially equal.

It is also possible that the radiation detector 6 includes a display part such as a liquid crystal display so as to display images formed from image data created by the arithmetic section 80, that is, regional image data, shape recognizing image data, material identifying image data, and composite image data.

The invention claimed is:

1. A radiation detector which detects radiation that was irradiated onto a specimen and passed through the specimen by discriminating it by a plurality of energy regions, comprising:
   a radiation detecting section which generates output signals corresponding to energy of incident radiation; and
   a signal processing section which discriminates the output signals by first through N-th signal discrimination thresholds corresponding to N (N: integer of 1 or more) energy values for dividing the plurality of energy regions, and acquires regional counts as radiation counts per a predetermined time in the plurality of energy regions by counting the discriminated output signals, wherein
   when radiation which is to be irradiated onto the specimen and before passing through the specimen is defined as reference radiation,
   the first through N-th signal discrimination thresholds are set so that reference regional counts as the regional counts in the plurality of energy regions when the radiation detecting section detects the reference radiation become substantially equal.

2. The radiation detector according to claim 1, wherein the signal processing section includes:
   a signal discriminating section which discriminates the output signals by the first through N-th signal discrimination thresholds;
   a counting section which acquires threshold-based counts as radiation counts per a predetermined time of the first through N-th signal discrimination thresholds by counting output signals discriminated by the signal discriminating section;
   an arithmetic section which calculates the regional counts based on the threshold-based counts acquired by the counting section; and
   a threshold setting section which sets the first through N-th signal discrimination thresholds in the signal discriminating section so that the reference regional counts in the plurality of energy regions become substantially equal.

3. The radiation detector according to claim 2, wherein the first signal discrimination threshold corresponds to the minimum energy value among the N energy values, and
   when a value obtained by dividing a threshold-based count acquired by the first signal discrimination threshold in the case where the radiation detecting section detects the reference radiation by the number of energy regions is defined as a regulated value,
   the threshold setting section sets
   the first through N-th signal discrimination thresholds so that the reference regional counts in the plurality of energy regions substantially coincide with the regulated value.

4. The radiation detector according to claim 2, wherein the first signal discrimination threshold corresponds to the minimum energy value among the N energy values, and
   the arithmetic section creates regional image data for forming images of the specimen in the plurality of energy regions based on the regional counts in the plurality of energy regions, creates material identifying image data for forming a material identifying image containing extracted material information of the specimen based on the plurality of regional image data, and creates shape recognizing image data for forming a shape recognizing image showing the shape of the specimen based on the threshold-based count with respect to the first signal discrimination threshold acquired in the counting section, and then creates composite image data for forming a composite image composed of the shape recognizing image and the material identifying image from the shape recognizing image data and the material identifying image data.

5. The radiation detector according to claim 1, wherein the signal processing section creates
   regional image data for forming images of the specimen in the plurality of energy regions based on the regional counts in the plurality of energy regions when the radiation detecting section detects radiation that passed through the specimen.

6. A radiation detection method for detecting radiation that was irradiated onto a specimen and passed through the specimen by discriminating it by a plurality of energy regions by a radiation detector which includes a radiation detecting section for detecting radiation and a signal processing section for counting output signals output from the radiation detecting section by discriminating the output signals by signal discrimination thresholds, comprising:
   a detection step at which radiation is detected by the radiation detecting section and output signals corresponding to energy of the detected radiation are generated;
   a signal discrimination step at which the output signals generated at the detection step are discriminated in the signal processing section by using first through N-th signal discrimination thresholds corresponding to N (N: integer of 1 or more) energy values for dividing the plurality of energy regions; and
   a count acquisition step at which regional counts as radiation counts per a predetermined time in the plurality of energy regions are acquired by counting the output signals discriminated through the signal discrimination step in the signal processing section, and
   when radiation which is to be irradiated onto the specimen and before passing through the specimen is defined as reference radiation,
   the first through N-th signal discrimination thresholds are set so that reference regional counts as the regional counts in the plurality of energy regions when detecting the reference radiation at the detection step become substantially equal.

7. The radiation detection method according to claim 6, wherein
   the count acquisition step includes:
   a counting step at which threshold-based counts as radiation counts per a predetermined time with respect to the first through N-th signal discrimination thresholds are acquired by counting the output signals discriminated through the signal discrimination step; and
   an arithmetic operation step at which the regional counts are calculated based on the threshold-based counts acquired through the counting step.

8. The radiation detection method according to claim 7, wherein
   the first signal discrimination threshold corresponds to the minimum energy value among the N energy values, and
   the radiation detection method further comprises an image data creation step at which image data for forming images of the specimen are created when the radiation detecting section detects radiation that passed through the specimen, and the image data creation step includes:

a shape recognizing image data creation step at which shape recognizing image data for forming a shape recognizing image showing the shape of the specimen is created based on threshold-based counts acquired by using the first signal discrimination threshold at the count acquisition step;

a regional image data creation step at which regional image data for forming images of the specimen in the plurality of energy regions are created based on regional counts in the plurality of energy regions acquired through the count acquisition step;

a material identifying image data creation step at which material identifying image data for forming a material identifying image containing extracted material information of the specimen is created based on the regional image data corresponding to the plurality of energy regions created through the regional image data creation step; and a composite image data creation step at which composite image data for forming a composite image composed of the shape recognizing image and the material identifying image is created from the shape recognizing image data and the material identifying image data.

9. The radiation detection method according to claim 6, further comprising a regional image data creation step at which, when the radiation detecting section detects radiation that passed through the specimen at the detection step, regional image data for forming images of the specimen in the plurality of energy regions are created based on the regional counts acquired through the count acquisition step.

10. The radiation detection method according to claim 6, further comprising:

a threshold setting step at which the first through N-th signal discrimination thresholds are set, wherein the threshold setting step includes:

a first setting step at which the first signal discrimination threshold is set so as to correspond to the minimum energy value among the N energy values;

a reference radiation detection step at which the reference radiation is detected by the radiation detecting section and reference output signals as output signals corresponding to energy of the reference radiation are generated;

a reference count acquisition step at which a reference count as a radiation count per a predetermined time is acquired by discriminating and counting the reference output signals by using the first signal discrimination threshold in the signal processing section; and a second setting step at which second through N-th signal discrimination thresholds of the first through N-th signal discrimination thresholds are set by using radiation counts per a predetermined time acquired by discriminating and counting the reference output signals in the signal processing section while changing the signal discrimination threshold in the signal processing section, and the reference count.

11. The radiation detection method according to claim 10, wherein the second setting step includes:

an m-th threshold setting step at which the m-th signal discrimination threshold (m: integer of 2 to N) is set among the second through N-th signal discrimination thresholds, where a signal discrimination threshold when the difference between a radiation count per a predetermined time acquired by discriminating and counting the reference output signals while changing the signal discrimination threshold in the signal processing section from the (m−1)th signal discrimination threshold and a radiation count per the predetermined time acquired by discriminating and counting the reference output signals by setting the signal discrimination threshold in the signal processing section to the (m−1)th signal discrimination threshold substantially coincides with a regulated value determined according to the reference count, is set as the m-th signal discrimination threshold, and by repeating the m-th threshold setting step, second through N-th signal discrimination thresholds are set.

12. The radiation detection method according to claim 10, wherein at the first setting step, a signal discrimination threshold when a count per a predetermined time acquired by discriminating and counting output signals output from the radiation detecting section while changing the signal discrimination threshold in the signal processing section when no radiation is made incident on the radiation detecting section becomes equal to or less than a reference value, is set as the first signal discrimination threshold.

* * * * *